United States Patent
Nagae et al.

(10) Patent No.: US 11,921,078 B2
(45) Date of Patent: Mar. 5, 2024

(54) SENSOR ELEMENT AND GAS SENSOR

(71) Applicant: NGK INSULATORS, LTD., Aichi (JP)

(72) Inventors: Tomoki Nagae, Nagoya (JP);
Yoshimasa Kondo, Nagoya (JP);
Yusuke Ogiso, Nagakute (JP);
Katsunao Uenishi, Nagoya (JP);
Atsushi Watanabe, Kasugai (JP);
Ayato Koizumi, Nagoya (JP)

(73) Assignee: NGK INSULATORS, LTD., Nagoya (JP)

(*) Notice: Subject to any disclaimer, the term of this patent is extended or adjusted under 35 U.S.C. 154(b) by 285 days.

(21) Appl. No.: 17/411,081

(22) Filed: Aug. 25, 2021

(65) Prior Publication Data

US 2021/0389267 A1    Dec. 16, 2021

Related U.S. Application Data

(63) Continuation of application No. PCT/JP2019/050677, filed on Dec. 24, 2019.

(30) Foreign Application Priority Data

Feb. 26, 2019 (JP) .................. 2019-033351
Nov. 22, 2019 (JP) .................. 2019-211703

(51) Int. Cl.
*G01N 27/407*    (2006.01)

(52) U.S. Cl.
CPC ..... *G01N 27/4074* (2013.01); *G01N 27/4076* (2013.01); *G01N 27/4077* (2013.01); *G01N 27/4078* (2013.01)

(58) Field of Classification Search
CPC ........... G01N 27/4074; G01N 27/4076; G01N 27/4077; G01N 27/4078
See application file for complete search history.

(56) References Cited

U.S. PATENT DOCUMENTS 9,512,770 B2 * 12/2016 Oya .............. F01N 11/007
10,228,346 B2 * 3/2019 Sakakibara ........ G01N 27/4077
(Continued)

FOREIGN PATENT DOCUMENTS

| CN | 104345081 A | 2/2015 |
| JP | 07-043339 A | 2/1995 |

(Continued)

OTHER PUBLICATIONS

International Preliminary Report on Patentability received in corresponding International Application No. PCT/JP2019/050677 dated Sep. 10, 2021.

(Continued)

*Primary Examiner* — Freddie Kirkland, III
(74) *Attorney, Agent, or Firm* — MATTINGLY & MALUR, PC

(57) ABSTRACT

A sensor element includes an element body and a porous protective layer arranged to cover a part of a surface of the element body. The protective layer includes an inlet protective layer arranged to cover a gas inlet formed in the surface of the element body, and at least a part of a face included in the surface of the element body, the face on which the gas inlet is opens, and an arithmetic average roughness Rap of an inner peripheral surface of an internal space of the inlet protective layer satisfies at least one of conditions below: the arithmetic average roughness Rap is 8 μm or more, and the arithmetic average roughness Rap is higher than an arithmetic average roughness Rac of a bonding surface of the protective layer, the bonding surface at which the protective layer is bonded to the element body.

7 Claims, 5 Drawing Sheets

(56) References Cited

U.S. PATENT DOCUMENTS

| | | | |
|---|---|---|---|
| 10,267,762 B2* | 4/2019 | Hino | G01N 33/0037 |
| 10,436,740 B2* | 10/2019 | Nees | H01M 4/8889 |
| 10,866,206 B2* | 12/2020 | Hino | G01N 27/4077 |
| 11,486,852 B2* | 11/2022 | Onishi | G01N 27/4071 |
| 2015/0040642 A1 | 2/2015 | Oya | |
| 2015/0338371 A1 | 11/2015 | Schneider et al. | |
| 2016/0161445 A1 | 6/2016 | Sakakibara et al. | |
| 2016/0282298 A1 | 9/2016 | Hino et al. | |
| 2016/0282301 A1 | 9/2016 | Ino et al. | |

FOREIGN PATENT DOCUMENTS

| | | |
|---|---|---|
| JP | 2012-168030 A | 9/2012 |
| JP | 2015-34782 A | 2/2015 |
| JP | 2016-109685 A | 6/2016 |
| JP | 2016-188853 A | 11/2016 |
| JP | 2016-188856 A | 11/2016 |

OTHER PUBLICATIONS

International Search Report of PCT/JP2019/050677 dated Mar. 10, 2020.
Chinese Office Action received in corresponding Chinese Application No. 201980090924.6 dated Oct. 12, 2023.

* cited by examiner

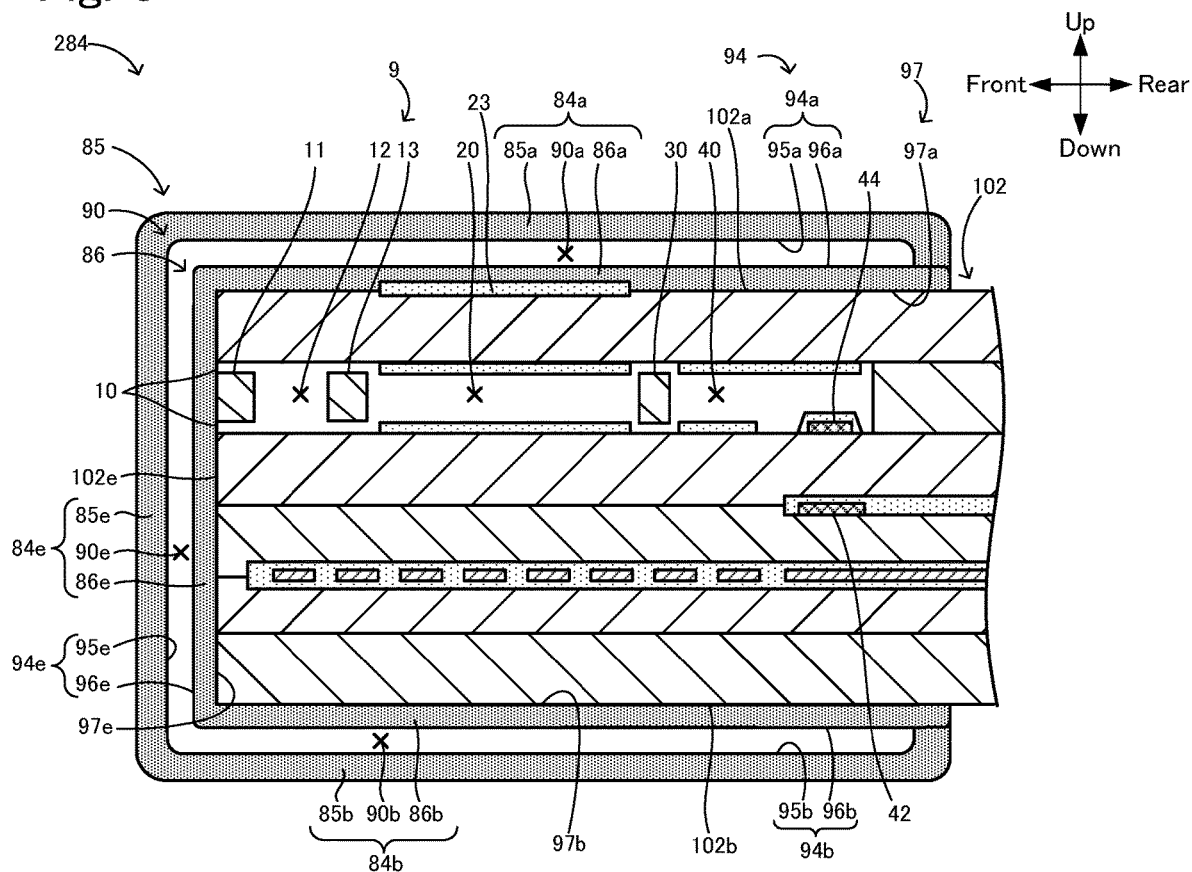
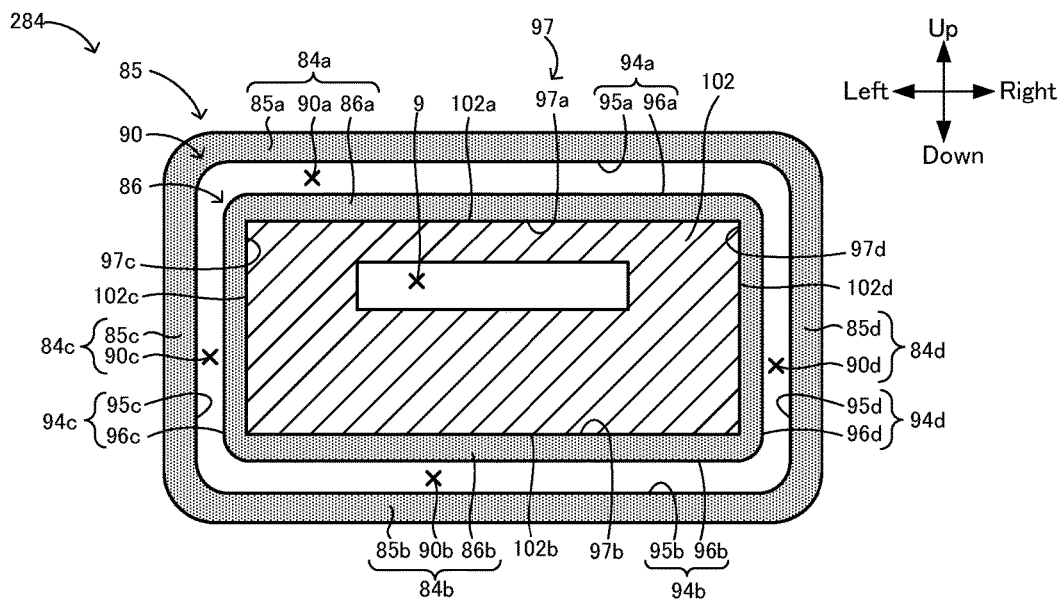

SENSOR ELEMENT AND GAS SENSOR

CROSS-REFERENCE TO RELATED APPLICATION

This application is a continuation application of PCT/JP2019/050677, filed on Dec. 24, 2019, which claims the benefit of priority of Japanese Patent Application No. 2019-033351, filed on Feb. 26, 2019 and Japanese Patent Application No. 2019-211703, filed on Nov. 22, 2019, the entire contents of which are incorporated herein by reference.

BACKGROUND OF THE INVENTION

1. Field of the Invention

The present invention relates to a sensor element and a gas sensor.

2. Description of the Related Art

Gas sensors including a sensor element that detects the concentration of a specific gas, such as NOx, in a measurement-object gas, such as an automobile exhaust gas, are known. It is also known that some of these gas sensors include a protective layer that covers the surface of the sensor element, the protective layer having a space formed therein (e.g., PTL 1). In PTL 1, the protective layer has an exposure space at which the surface of the element body is exposed. The exposure space limits a reduction in the temperature of the element body which may occur when water is adhered onto the surface of the protective layer and thereby enhances the waterproofing performance of the element body.

CITATION LIST

Patent Literature

PTL 1: JP 2016-188853 A

SUMMARY OF THE INVENTION

When the sensor element detects a specific gas concentration in a measurement-object gas, the detected specific gas concentration may vary although the specific gas concentration does not fluctuate in reality.

The present invention was made in order to address the above issue. A main object is to reduce variations in the specific gas concentration detected by the sensor element.

In the present invention, the following measures were adopted so as to achieve the main object.

A sensor element of the present invention detects a specific gas concentration in a measurement-object gas, the sensor element includes:
  an element body including an oxygen-ion-conductive solid electrolyte body, the element body having a measurement-object gas flow section formed therein, the measurement-object gas flow section through which a measurement-object gas is introduced and flows;
  a measurement electrode disposed on an inner peripheral surface of the measurement-object gas flow section;
  a reference electrode disposed in the element body, the reference electrode being exposed to a reference gas used as a reference for detecting the specific gas concentration; and
  a porous protective layer arranged to cover a part of a surface of the element body,
  wherein the protective layer includes an inlet protective layer arranged to cover a gas inlet formed in the surface of the element body, the gas inlet being an inlet of the measurement-object gas flow section, and at least a part of a face included in the surface of the element body, the face on which the gas inlet is opens,
  the inlet protective layer has an internal space formed therein, and
  an arithmetic average roughness Rap of an inner peripheral surface of the internal space of the inlet protective layer satisfies at least one of conditions below: the arithmetic average roughness Rap is 8 μm or more, and the arithmetic average roughness Rap is higher than an arithmetic average roughness Rac of a bonding surface of the protective layer, the bonding surface at which the protective layer is bonded to the element body.

The above-described sensor element includes a measurement electrode disposed on the inner peripheral surface of the measurement-object gas flow section and a reference electrode exposed to a reference gas used as a reference for detecting a specific gas concentration. This sensor element is capable of detecting the specific gas concentration in a measurement-object gas on the basis of the voltage between the measurement electrode and the reference electrode. The sensor element also includes an inlet protective layer covering a gas inlet formed in the surface of the element body, the gas inlet being an inlet of the measurement-object gas flow section, and at least a part of a face included in the surface of the element body, the face on which the gas inlet opens. The arithmetic average roughness Rap of the inner peripheral surface of an internal space formed in the inlet protective layer satisfies at least one of the conditions below: the arithmetic average roughness Rap is 8 μm or more, and the arithmetic average roughness Rap is higher than the arithmetic average roughness Rac of the bonding surface of the protective layer at which the protective layer is bonded to the element body. That is, the inner peripheral surface of the internal space of the introduction protective layer has a relatively high arithmetic average roughness Rap, that is, relatively large irregularities formed therein. Consequently, when a measurement-object gas is passed from the outside of the protective layer to the gas inlet through the internal space of the inlet protective layer, the irregularities present in the inner peripheral surface of the internal space cause the flow of the measurement-object gas in the internal space to be converted into a turbulent flow. The turbulent flow stirs the measurement-object gas and thereby increases the uniformity in the specific gas concentration in the measurement-object gas. As a result, variations in the specific gas concentration in the measurement-object gas introduced into the measurement-object gas flow section are reduced and, accordingly, fluctuations in the voltage between the measurement electrode and the reference electrode which are caused due to the variations in the specific gas concentration are reduced. Thus, variations in the specific gas concentration detected by the sensor element can be reduced.

In the above case, the arithmetic average roughness Rap may be 100 μm or less. If the arithmetic average roughness Rap is higher than 100 the irregularities present in the inner peripheral surface of the internal space of the inlet protective layer increase resistance to the flow of a measurement-object gas and reduce the likelihood of the measurement-object gas reaching the gas inlet. This may reduce the responsivity of the sensor element. When the arithmetic average roughness Rap is 100 or less, the reduction in responsivity can be prevented. The gas inlet may be formed in the internal space of the inlet protective layer. The internal space of the inlet protective layer may be an exposure space to which the surface of the element body is exposed. The element body may have an elongate shape having a longitudinal direction. The element body may have an elongate, rectangular parallelepiped shape.

In the sensor element according to the present invention, the arithmetic average roughness Rap may be 10 μm or more. When the arithmetic average roughness Rap is 10 μm or more, variations in the specific gas concentration detected by the sensor element may be further reduced. The arithmetic average roughness Rap may be 20 μm or more or may be 30 μm or more.

In the sensor element according to the present invention, the arithmetic average roughness Rac may be 0.1 or more and 1.0 μm or less. When the arithmetic average roughness Rac is 0.1 μm or more, the adhesion strength between the element body and the protective layer can be maintained at a certain level. When the arithmetic average roughness Rac is 1.0 μm or less, the strength of the protective layer can be maintained at a certain level.

In the sensor element according to the present invention, the surface of the element body may include the face on which the gas inlet opens and one or more adjacent faces that each meet the above face along a side of the above face. Moreover, the protective layer may include an adjacent-face protective layer that covers at least a part of the one or more adjacent faces. Furthermore, the adjacent-face protective layer may have an internal space formed therein, the internal space being directly communicated with the internal space of the inlet protective layer, an arithmetic average roughness Ras of an inner peripheral surface of the internal space of the adjacent-face protective layer satisfying at least one of conditions below: the arithmetic average roughness Ras is 8 μm or more, and the arithmetic average roughness Ras is higher than the arithmetic average roughness Rac. In such a case, the presence of the adjacent-face protective layer enhances the waterproofing performance of the element body. In addition, since the adjacent-face protective layer has an internal space, the conduction of heat from the outside of the adjacent-face protective layer toward the element body in the thickness direction of the adjacent-face protective layer can be suppressed by the internal space. This further enhances the waterproofing performance of the element body. Moreover, since the internal space of the adjacent-face protective layer and the internal space of the inlet protective layer are directly communicated with each other, the adjacent-face protective layer has a relatively wide internal space formed therein. This further enhances the waterproofing performance of the element body. Furthermore, the arithmetic average roughness Ras of the inner peripheral surface of the internal space of the adjacent-face protective layer satisfies at least one of the conditions below: the arithmetic average roughness Ras is 8 μm or more, and the arithmetic average roughness Ras is higher than the arithmetic average roughness Rac. In other words, the adjacent-face protective layer has an internal space having an inner peripheral surface having a relatively high arithmetic average roughness Ras. Thus, the irregularities of the internal space of the adjacent-face protective layer cause the flow of the measurement-object gas in the internal space to be converted into a turbulent flow. This reduces the likelihood of a measurement-object gas moving from the internal space of the inlet protective layer to the internal space of the adjacent-face protective layer. This enables the measurement-object gas present in the internal space of the adjacent-face protective layer to readily enter the measurement-object gas flow section from the gas inlet and consequently increases the responsivity of the sensor element. That is, while the internal space of the adjacent-face protective layer and the internal space of the inlet protective layer are directly communicated with each other in order to enhance the waterproofing performance of the element body, a reduction in responsivity which may occur when the above internal spaces are directly communicated with each other can be prevented by setting the arithmetic average roughness Ras to be relatively high. Note that the expression "directly communicated" used herein means that the above internal spaces are communicated with each other not through the pores present in the protective layer.

In the sensor element according to the present invention, the element body may have an elongate shape having a longitudinal direction, and the face on which the gas inlet opens may be an end surface of the element body in the longitudinal direction.

In the above case, the element body may be a layered body including a plurality of layers composed of the solid electrolyte body, the layers being stacked on top of one another in a stacking direction perpendicular to the longitudinal direction. Furthermore, the surface of the element body may include the end surface and a plurality of adjacent faces that each meet the end surface along a side of the end surface. Moreover, the protective layer may include an adjacent-face protective layer that covers the plurality of adjacent faces. In addition, parts of the adjacent-face protective layer which each cover a specific one of top and bottom surfaces included in the adjacent faces, the top and bottom surfaces being located at respective ends of the element body in the stacking direction, may each have an internal space formed therein and may include an outer protective layer arranged closer to the outside of the sensor element than the internal space and an inner protective layer arranged closer to the inside of the sensor element than the internal space, the inner protective layer being bonded on the surface of the element body. In such a case, the presence of the inner protective layer arranged in contact with the top and bottom surfaces increases the thermal capacity of the element body (to be exact, the element body and the inner protective layer). Therefore, even if a thermal shock transmits from the outside to the element body, a sudden change in the temperature of the element body can be avoided. This enhances the waterproofing performance of the element body.

A gas sensor according to the present invention includes the sensor element according to any one of the above-described aspects. Therefore, the above gas sensor may have the same advantageous effects as the above-described sensor element according to the present invention. That is, for example, variations in the specific gas concentration detected by the sensor element may be reduced.

BRIEF DESCRIPTION OF THE DRAWINGS

FIG. 6 is a cross-sectional view of a protective layer 284 according to a modification example.

FIG. 7 is a cross-sectional view of the protective layer 284 according to a modification example.

DETAILED DESCRIPTION OF THE INVENTION

Figure 1:
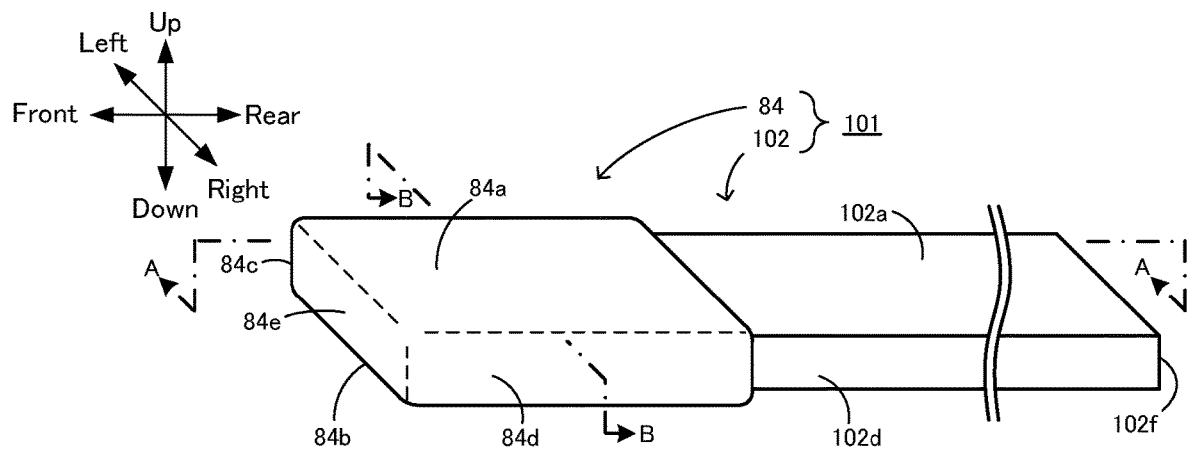
FIG. 1 is a perspective view of a sensor element 101.
Figure 2:
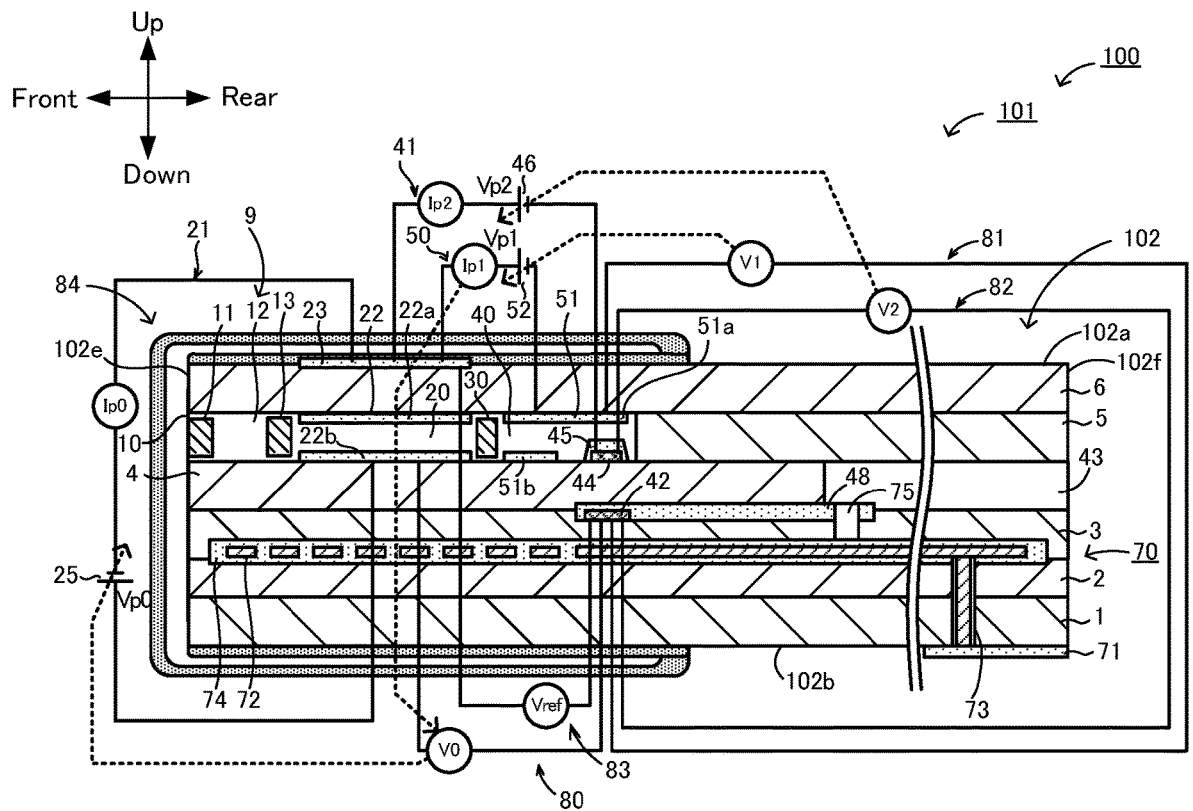
FIG. 2 is a cross-sectional view of a gas sensor 100, schematically illustrating the structure of the gas sensor 100.
Figure 3:
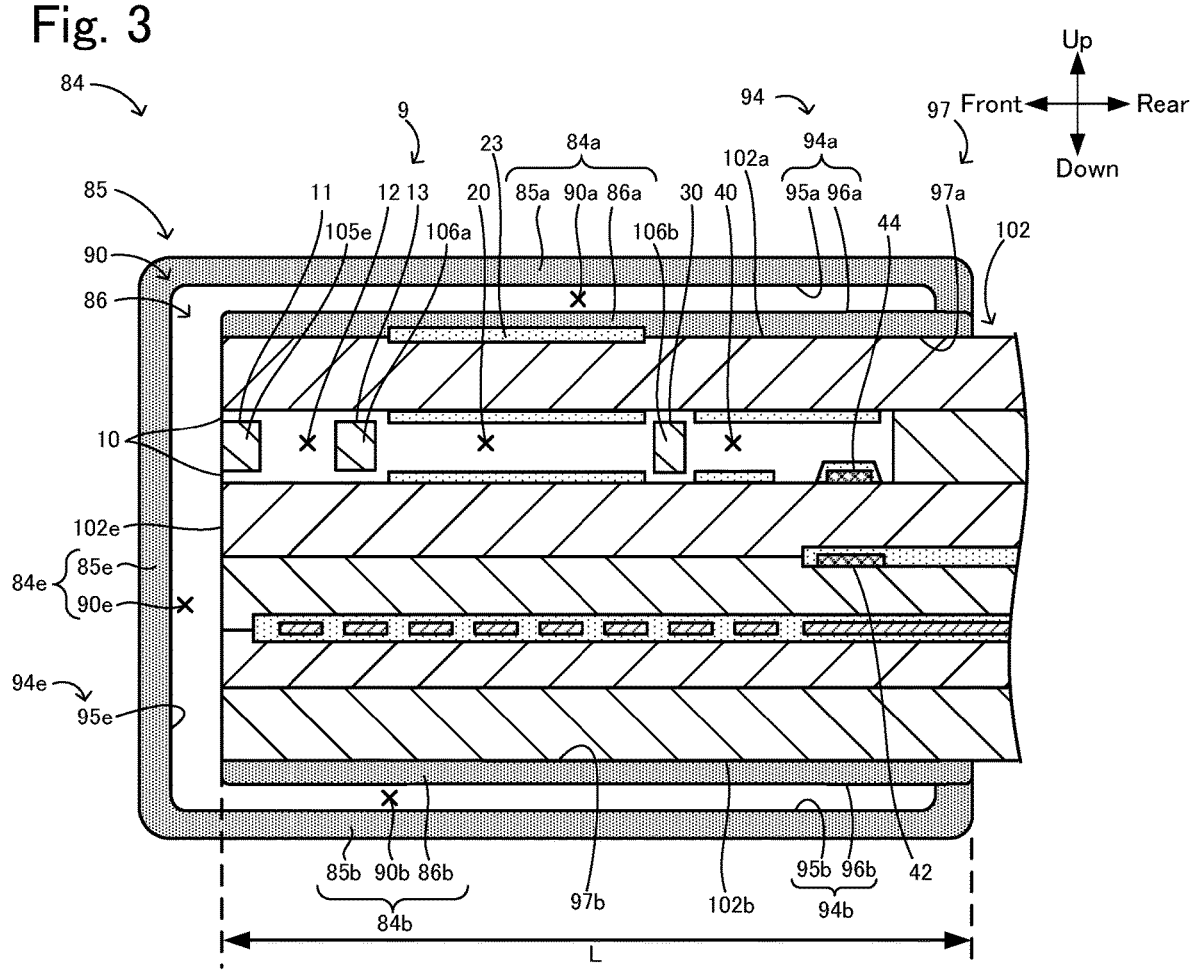
FIG. 3 is a magnified view of the periphery of the measurement-object gas flow section 9 illustrated in FIG. 2.
Figure 4:
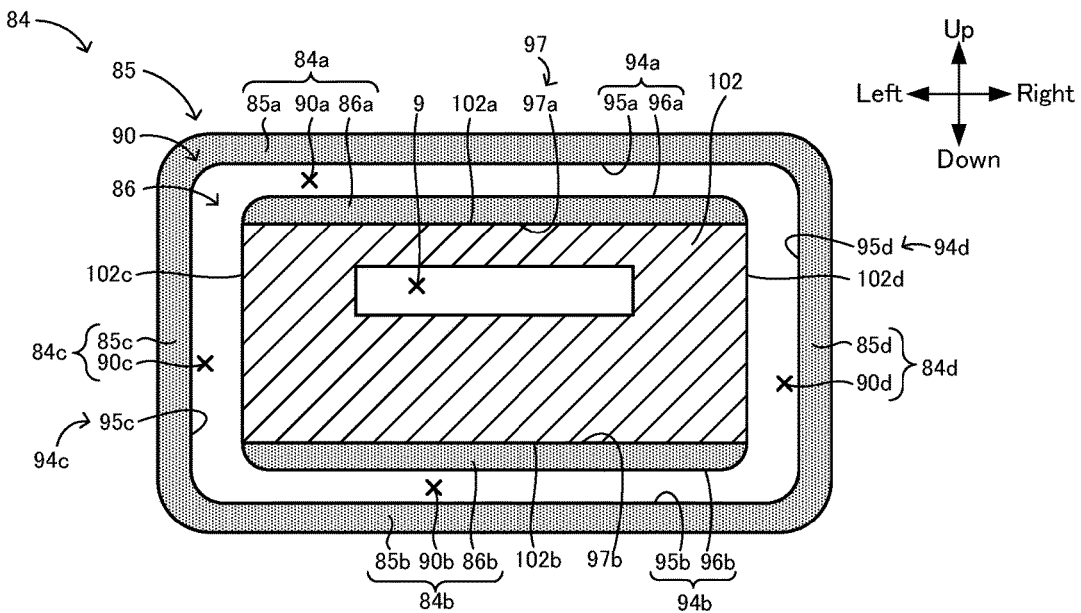
FIG. 4 is a cross-sectional view taken along the section B-B of FIG. 1.

An embodiment of the present invention is described below with reference to the attached drawings. FIG. 1 is a perspective view of a sensor element 101 included in a gas sensor 100 according to an embodiment of the present invention. FIG. 2 is a cross-sectional view of the gas sensor 100, schematically illustrating the structure of the gas sensor 100. The cross section of the sensor element 101 illustrated in FIG. 2 is the section A-A of FIG. 1. FIG. 3 is a magnified view of the periphery of the measurement-object gas flow section 9 illustrated in FIG. 2. FIG. 4 is a cross-sectional view taken along the section B-B of FIG. 1. Note that, in the cross-section illustrated in FIG. 4, the parts of the inside of the element body 102 which are other than the measurement-object gas flow section 9 are omitted. The sensor element 101 has an elongate, rectangular parallelepiped shape. Hereinafter, the longitudinal direction of the sensor element 101 (the horizontal direction in FIG. 2) is referred to as "front-rear direction", the thickness direction of the sensor element 101 (the vertical direction in FIG. 2) is referred to as "top-bottom direction", and the width direction of the sensor element 101 (the direction perpendicular to the front-rear and top-bottom directions) is referred to as "left-right direction".

The gas sensor 100 is attached to a piping, such as an automobile exhaust gas pipe, and used for measuring the concentration of a specific gas, such as NOx or $O_2$, in the exhaust gas, which is a measurement-object gas. In this embodiment, the specific gas concentration measured by the gas sensor 100 is NOx concentration. The gas sensor 100 includes a sensor element 101. The sensor element 101 includes an element body 102 and a porous protective layer 84 arranged to cover the element body 102. Note that the element body 102 is a part of the sensor element 101 which is other than the protective layer 84.

As illustrated in FIG. 2, the sensor element 101 is an element having a structure in which six layers composed of a first substrate layer 1, a second substrate layer 2, a third substrate layer 3, a first solid electrolyte layer 4, a spacer layer 5, and a second solid electrolyte layer 6, each being formed from an oxygen ion-conductive solid electrolyte layer of zirconia ($ZrO2$) or the like, are stacked in that order from the bottom side in FIG. 2. Also, the solid electrolyte constituting these six layers is dense and airtight. The above-described sensor element 101 is produced by, for example, subjecting ceramic green sheets corresponding to the individual layers to predetermined processing, printing of circuit patterns, and the like, stacking them thereafter, and further performing firing so as to integrate the ceramic green sheets.

In one front end portion (frontward end portion) of the sensor element 101 and between the lower surface of the second solid electrolyte layer 6 and the upper surface of the first solid electrolyte layer 4, a gas inlet 10, a first diffusion-controlled portion 11, a buffer space 12, a second diffusion-controlled portion 13, a first internal space 20, a third diffusion-controlled portion 30, and a second internal space 40 are formed in that order so as to adjoin and communicate.

The gas inlet 10, the buffer space 12, the first internal space 20, and the second internal space 40 are spaces in the inside of the sensor element 101 by hollowing the spacer layer 5, where the upper portion is defined by the lower surface of the second solid electrolyte layer 6, the lower portion is defined by the upper surface of the first solid electrolyte layer 4, and the side portions are defined by the side surfaces of the spacer layer 5.

The first diffusion-controlled portion 11, the second diffusion-controlled portion 13, and the third diffusion-controlled portion 30 are each formed as a pair of horizontal slits (the longitudinal direction of the openings is perpendicular to the drawing). Hereinafter, the space extending from the gas inlet 10 to the second internal space 40 is referred to as "measurement-object gas flow section 9". The measurement-object gas flow section 9 is formed in a substantially rectangular parallelepiped shape. The longitudinal direction of the measurement-object gas flow section 9 is parallel to the front-rear direction.

Meanwhile, at the position farther from the front end side than the measurement-object gas flow section 9, a reference gas introduction space 43 is provided at the location between the upper surface of the third substrate layer 3 and the lower surface of the spacer layer 5, where the side portions are defined by the side surfaces of the first solid electrolyte layer 4. For example, the air serving as the reference gas at the time of measurement of the NOx concentration is introduced into the reference gas introduction space 43.

An air introduction layer 48 is a layer composed of porous ceramics. The reference gas is introduced into the air introduction layer 48 through the gas introduction space 43. Also, the air introduction layer 48 is formed so as to cover a reference electrode 42.

The reference electrode 42 is an electrode formed so as to be sandwiched between the upper surface of the third substrate layer 3 and the first solid electrolyte layer 4 and, as described above, the air introduction layer 48 connected to the reference gas introduction space 43 is provided around the reference electrode 42. In addition, as described later, it is possible to measure the oxygen concentrations (oxygen partial pressures) in the first internal space 20 and the second internal space 40 by using the reference electrode 42.

In the measurement-object gas flow section 9, the gas inlet 10 is a part made open to the outside space, and the gas to be measured is taken from the outside space into the sensor element 101 through the gas inlet 10. The first diffusion-controlled portion 11 is a part for giving predetermined diffusion resistance to the gas to be measured, where the gas is taken from the gas inlet 10. The buffer space 12 is a space provided so as to lead the gas to be measured, where the gas is introduced from the first diffusion-controlled portion 11, to the second diffusion-controlled portion 13. The second diffusion-controlled portion 13 is a part for giving predetermined diffusion resistance to the gas to be measured, where the gas is introduced from the buffer space 12 to the first internal space 20. When the gas to be measured is introduced from the outside of the sensor element 101 into the first internal space 20, the gas to be measured, which is taken into the sensor element 101 through the gas inlet 10 rapidly because of the pressure fluctuation of the gas to be measured in the outside space (pulsation of an exhaust pressure in the case where the gas to be measured is an automotive exhaust gas), is not directly introduced into the first internal space 20 but introduced into the first internal space 20 after pressure fluctuation of the gas to be measured are canceled through the first diffusion-controlled portion 11, the buffer space 12, and the second diffusion-controlled portion 13. Consequently, pressure fluctuation of the gas to be measured, which is introduced into the first internal space 20, are made to be at an almost negligible level. The first internal space 20 is provided as a space for adjusting the oxygen partial pressure in the gas to be measured which is introduced through the second diffusion-controlled portion 13. The above-described oxygen partial pressure is adjusted by actuation of a main pump cell 21.

The main pump cell 21 is an electrochemical pump cell composed of an inside pump electrode 22 having a ceiling electrode portion 22a provided on an almost entire surface of the lower surface of the second solid electrolyte layer 6 facing the first internal space 20, an outside pump electrode 23 provided in a region, which corresponds to the ceiling electrode portion 22a on the upper surface of the second solid electrolyte layer 6, and the second solid electrolyte layer 6 sandwiched between these electrodes.

The inside pump electrode 22 is formed so as to extend over the upper and lower solid electrolyte layers (second solid electrolyte layer 6 and first solid electrolyte layer 4) defining the first internal space 20 and the spacer layer 5 providing the side walls. Specifically, the ceiling electrode portion 22a is formed on the lower surface of the second solid electrolyte layer 6 providing the ceiling surface of the first internal space 20 and a bottom electrode portion 22b is formed on the upper surface of the first solid electrolyte layer 4 providing the bottom surface. Then, side electrode portions (not shown in the drawing) are formed on the side wall surfaces (inner surfaces) of the spacer layer 5 constituting both side wall portions of the first internal space 20 so as to connect the ceiling electrode portion 22a to the bottom electrode portion 22b. Thus, the inside pump electrode 22 is disposed in the form of a tunnel-like structure in a zone where the side electrode portions are disposed.

The inside pump electrode 22 and the outside pump electrode 23 are formed as porous cermet electrodes (for example, a cermet electrode of Pt containing 1% of Au and ZrO2). In this regard, the inside pump electrode 22 to contact with the gas to be measured is formed by using a material having weakened ability to reduce NOx components in the gas to be measured.

In the main pump cell 21, oxygen in the first internal space 20 can be pumped out to the outside space or oxygen in the outside space can be pumped into the first internal space 20 by applying a predetermined pump voltage Vp0 between the inside pump electrode 22 and the outside pump electrode 23 and passing a pump current Ip0 between the inside pump electrode 22 and the outside pump electrode 23 in the positive direction or negative direction.

In addition, in order to detect the oxygen concentration (oxygen partial pressure) in the atmosphere in the first internal space 20, an electrochemical sensor cell, that is, a main pump controlling oxygen partial pressure detection sensor cell 80 is constructed by the inside pump electrode 22, the second solid electrolyte layer 6, the spacer layer 5, the first solid electrolyte layer 4, the third substrate layer 3, and the reference electrode 42.

The oxygen concentration (oxygen partial pressure) in the first internal space 20 is determined by measuring the electromotive force V0 of the main pump controlling oxygen partial pressure detection sensor cell 80. Further, the pump current Ip0 is controlled by feedback-controlling the pump voltage Vp0 of a variable power supply 25 such that the electromotive force V0 becomes a target value. Consequently, the oxygen concentration in the first internal space 20 can be maintained at a predetermined constant value.

The third diffusion-controlled portion 30 is a part which gives predetermined diffusion resistance to the gas to be measured, the oxygen concentration (oxygen partial pressure) of the gas having been controlled by the operation of the main pump cell 21 in the first internal space 20, and leads the gas to be measured into the second internal space 40.

The second internal space 40 is provided as a space for performing a treatment related to the measurement of the nitrogen oxide (NOx) concentration in the gas to be measured that is introduced through the third diffusion-controlled portion 30. The NOx concentration is measured mainly in the second internal space 40 in which the oxygen concentration is adjusted by an auxiliary pump cell 50 and further the NOx concentration is measured by the operation of a measurement pump cell 41.

In the second internal space 40, the gas to be measured is further subjected to adjustment of the oxygen partial pressure by the auxiliary pump cell 50, the gas to be measured having been subjected to adjustment of the oxygen concentration (oxygen partial pressure) in the first internal space 20 in advance and, thereafter, having been introduced through the third diffusion-controlled portion 30. Consequently, the oxygen concentration in the second internal space 40 can be maintained constant with high accuracy and, therefore, the gas sensor 100 can measure the NOx concentration with high accuracy.

The auxiliary pump cell 50 is an auxiliary electrochemical pump cell constructed by an auxiliary pump electrode 51 having a ceiling electrode portion 51a provided on an almost entire surface of the lower surface of the second solid electrolyte layer 6 facing the second internal space 40, an outside pump electrode 23 (not limited to the outside pump electrode 23, and the sensor element 101 and an appropriate outside electrode will suffice), and the second solid electrolyte layer 6.

The above-described auxiliary pump electrode 51 is arranged in the second internal space 40 so as to have a similar tunnel-like structure to the above-described inside pump electrode 22 disposed in the first internal space 20. That is, a tunnel-like structure is constructed, in which the ceiling electrode portion 51a is formed on the second solid electrolyte layer 6 providing the ceiling surface of the second internal space 40, a bottom electrode portion 51b is formed on the first solid electrolyte layer 4 providing the bottom surface of the second internal space 40, and then, side electrode portions (not shown in the drawing) for connecting the ceiling electrode portion 51a to the bottom electrode portion 51b are formed on both side wall surfaces of the spacer layer 5 providing side walls of the second internal space 40. In this regard, the auxiliary pump electrode 51 is formed by using a material having weakened ability to reduce NOx components in the gas to be measured in the same manner as the inside pump electrode 22.

In the auxiliary pump cell 50, oxygen in the atmosphere in the second internal space 40 can be pumped out to the outside space or oxygen in the outside space can be pumped into the second internal space 40 by applying a predetermined pump voltage Vp1 between the auxiliary pump electrode 51 and the outside pump electrode 23.

In addition, in order to control the oxygen partial pressure in the atmosphere in the second internal space 40, an electrochemical sensor cell, that is, an auxiliary pump controlling oxygen partial pressure detection sensor cell 81 is constructed by the auxiliary pump electrode 51, the reference electrode 42, the second solid electrolyte layer 6, the spacer layer 5, the first solid electrolyte layer 4, and the third substrate layer 3.

In this regard, the auxiliary pump cell 50 performs pumping by a variable power supply 52 which is voltage-controlled on the basis of the electromotive force V1 detected by the auxiliary pump controlling oxygen partial pressure detection sensor cell 81. Consequently, the oxygen partial pressure in the atmosphere in the second internal space 40 is controlled to a low partial pressure that does not substantially affect the measurement of NOx.

In addition to this, the pump current Ip1 thereof is used for controlling the electromotive force of the main pump controlling oxygen partial pressure detection sensor cell 80. Specifically, the pump current Ip1 serving as a control signal is input into the main pump controlling oxygen partial pressure detection sensor cell 80, and by controlling the above-described target value of the electromotive force V0 thereof the gradient of the oxygen partial pressure in the gas to be measured, which is introduced from the third diffusion-controlled portion 30 into the second internal space 40, is controlled so as to be always constant. In the case of application as a NOx sensor, the oxygen concentration in the second internal space 40 is maintained at a constant value of about 0.001 ppm by the functions of the main pump cell 21 and the auxiliary pump cell 50.

The measurement pump cell 41 measures the NOx concentration in the gas to be measured in the second internal space 40. The measurement pump cell 41 is an electrochemical pump cell constructed by a measurement electrode 44 disposed on the upper surface of the first solid electrolyte layer 4 facing the second internal space 40 and at the position apart from the third diffusion-controlled portion 30, the outside pump electrode 23, the second solid electrolyte layer 6, the spacer layer 5, and the first solid electrolyte layer 4.

The measurement electrode 44 is a porous cermet electrode. The measurement electrode 44 also functions as a NOx reduction catalyst for reducing NOx present in the atmosphere in the second internal space 40. Further, the measurement electrode 44 is covered with a fourth diffusion-controlled portion 45.

The fourth diffusion-controlled portion 45 is a film composed of a ceramic porous body. The fourth diffusion-controlled portion 45 has a function of restricting the amount of NOx flowing into the measurement electrode 44 and, in addition, a function as a protective film for the measurement electrode 44. In the measurement pump cell 41, oxygen generated by decomposition of nitrogen oxides in the atmosphere around the measurement electrode 44 is pumped out and the amount of generation thereof can be detected as a pump current Ip2.

Also, in order to detect the oxygen partial pressure around the measurement electrode 44, an electrochemical sensor cell, that is, a measurement pump controlling oxygen partial pressure detection sensor cell 82 is constructed by the first solid electrolyte layer 4, the third substrate layer 3, the measurement electrode 44, and the reference electrode 42. A variable power supply 46 is controlled on the basis of the electromotive force V2 detected by the measurement pump controlling oxygen partial pressure detection sensor cell 82.

The gas to be measured, which is introduced into the second internal space 40, reaches the measurement electrode 44 through the fourth diffusion-controlled portion 45 under circumstances where the oxygen partial pressure is controlled. Nitrogen oxides in the gas to be measured around the measurement electrode 44 are reduced (2NO□N2+O2) and oxygen is generated. Then, the resulting oxygen is pumped by the measurement pump cell 41. At that time, the voltage Vp2 of the variable power supply 46 is controlled such that the control voltage V2 that is detected by the measurement pump controlling oxygen partial pressure detection sensor cell 82 is constant (target value). The amount of oxygen generated around the measurement electrode 44 is proportional to the concentration of the nitrogen oxides in the gas to be measured and, therefore, the nitrogen oxide concentration in the gas to be measured is calculated by using the pump current Ip2 in the measurement pump cell 41.

In addition, in the case where the measurement electrode 44, the first solid electrolyte layer 4, the third substrate layer 3, and the reference electrode 42 are combined so as to constitute an oxygen partial pressure detection device as an electrochemical sensor cell, the electromotive force in accordance with the difference between the amount of oxygen generated by reduction of NOx components in the atmosphere around the measurement electrode 44 and the amount of oxygen contained in the reference air can be detected and, thereby, the concentration of NOx components in the gas to be measured can be determined.

Further, an electrochemical sensor cell 83 is constructed by the second solid electrolyte layer 6, the spacer layer 5, the first solid electrolyte layer 4, the third substrate layer 3, the outside pump electrode 23, and the reference electrode 42. The oxygen partial pressure in the gas to be measured in the outside of the sensor can be detected by the electromotive force Vref obtained by the sensor cell 83.

In the gas sensor 100 having the above-described configuration, the gas to be measured, which has an oxygen partial pressure always maintained at a low constant value (value that does not substantially affect the measurement of NOx) by actuation of the main pump cell 21 and the auxiliary pump cell 50, is fed to the measurement pump cell 41. Therefore, the NOx concentration in the gas to be measured can be determined on the basis of the pump current Ip2 that flows because oxygen, which is generated by reduction of NOx nearly in proportion to the NOx concentration in the gas to be measured, is pumped out of the measurement pump cell 41.

Further, in order to enhance the oxygen ion conductivity of the solid electrolyte, the sensor element 101 includes a heater portion 70 having a function of adjusting the temperature including heating the sensor element 101 and keeping the temperature. The heater portion 70 includes a heater connector electrode 71, a heater 72, a through hole 73, a heater insulating layer 74, and a pressure release hole 75.

The heater connector electrode 71 is an electrode formed so as to contact with the lower surface of the first substrate layer 1. The electric power can be supplied from the outside to the heater portion 70 by connecting the heater connector electrode 71 to an external power supply.

The heater 72 is an electric resistor formed to be sandwiched between the second substrate layer 2 and the third substrate layer 3 in the vertical direction. The heater 72 is connected to the heater connector electrode 71 through the through hole 73 and generates heat by being supplied with an electric power from the outside through the heater connector electrode 71 so as to heat the solid electrolyte constituting the sensor element 101 and keep the temperature.

Also, the heater 72 is embedded over an entire range from the first internal space 20 to the second internal space 40 and the entirety of the sensor element 101 can be adjusted to have a temperature at which the above-described solid electrolyte is activated.

The heater insulating layer 74 is an insulating layer formed on the upper and lower surfaces of the heater 72 by using an insulator, e.g., alumina. The heater insulating layer 74 is formed for the purpose of establishing electrical insulation between the second substrate layer 2 and the heater 72 and electrical insulation between the third substrate layer 3 and the heater 72.

The pressure release hole 75 is a part provided so as to penetrate the third substrate layer 3 and communicate with the reference gas introduction space 43 and is formed for the purpose of reducing an internal pressure increase associated with a temperature increase in the heater insulating layer 74.

As illustrated in FIGS. 1 to 4, the element body 102 is partially covered with the porous protective layer 84. Since the sensor element 101 is rectangular parallelepiped, the element body 102 (specifically, the layers 1 to 6) has the following six external surfaces as illustrated in FIGS. 1 to 4: a first surface 102a (top surface), a second surface 102b (bottom surface), a third surface 102c (left-side surface), a fourth surface 102d (right-side surface), a fifth surface 102e (front-end surface), and a sixth surface 102f (rear-end surface). The protective layer 84 includes first to fifth protective layers 84a to 84e, which are each disposed on a corresponding one of the five surfaces (the first to fifth surfaces 102a to 102e) out of the six surfaces of the element body 102 (the first to sixth surfaces 102a to 102f). The fifth protective layer 84e (an example of the inlet protective layer) covers the fifth surface 102e, which is one of the end surfaces of the element body 102 in the longitudinal direction (i.e., the front-rear direction), and the gas inlet 10 formed in the fifth surface 102e (see FIG. 3). The first to fourth protective layers 84a to 84d (examples of the adjacent-face protective layer) each cover a corresponding one of the four surfaces (the first to fourth surfaces 102a to 102d, which are examples of the adjacent faces) of the element body 102 which touch the fifth surface 102e along a side of the fifth surface 102e (see FIGS. 3 and 4). Hereinafter, the first to fifth protective layers 84a to 84e are referred to collectively as "protective layer 84". The protective layer 84 is arranged to cover and protect a part of the element body 102. For example, the protective layer 84 reduces the cracking of the element body 102 which may be caused due to the adhesion of moisture or the like included in the measurement-object gas.

As illustrated in FIGS. 3 and 4, the first protective layer 84a includes a first internal space 90a, a first outer protective layer 85a arranged closer to the outside than the first internal space 90a, and a first inner protective layer 86a arranged closer to the inside than the first internal space 90a. The first inner protective layer 86a is arranged in contact with the first surface 102a. The first inner protective layer 86a covers the outside pump electrode 23. Similarly, the second protective layer 84b includes a second internal space 90b, a second outer protective layer 85b, and a second inner protective layer 86b. The second inner protective layer 86b is arranged in contact with the second surface 102b. The third protective layer 84c includes a third internal space 90c and a third outer protective layer 85c arranged closer to the outside than the third internal space 90c. Since the third protective layer 84c does not include a protective layer arranged closer to the inside than the third internal space 90c, the third surface 102c is exposed to the third internal space 90c (see FIG. 4). Similarly, the fourth and fifth protective layers 84d and 84e include fourth and fifth internal spaces 90d and 90e and fourth and fifth outer protective layers 85d and 85e, respectively. The fourth and fifth surfaces 102d and 102e are exposed to the fourth and fifth internal spaces 90d and 90e, respectively (see FIGS. 3 and 4). The gas inlet 10 is exposed to the fifth internal space 90e. Hereinafter, the first to fifth outer protective layers 85a to 85e are referred to collectively as "outer protective layer 85", the first and second inner protective layers 86a and 86b are referred to collectively as "inner protective layer 86", and the first to fifth internal spaces 90a to 90e are referred to collectively as "internal space 90". The inner peripheral surfaces of the first to fifth internal spaces 90a to 90e are referred to as "first to fifth inner peripheral surfaces 94a to 94e", respectively, which are referred to collectively as "inner peripheral surface 94".

The first to fifth outer protective layers 85a to 85e are each joined to adjacent outer protective layers. The outer protective layer 85 covers the front end of the element body 102 as a whole. The first and second inner protective layers 86a and 86b directly cover parts of the first and second surfaces 102a and 102b which are covered with the first and second outer protective layers 85a and 85b, respectively. Thus, the first and second surfaces 102a and 102b are not exposed to the first and second internal spaces 90a and 90b, respectively. The first to fifth internal spaces 90a to 90e are each directly communicated with adjacent internal spaces. The internal space 90 forms one space as a whole. Note that the expression "directly communicated" means that the above internal spaces are communicated with one another not through the pores present in the protective layer 84 (i.e., the outer protective layer 85 and the inner protective layer 86). The outer protective layer 85 and the inner protective layer 86 are arranged in contact with each other at only the rear end of the protective layer 84 (see FIG. 3). Specifically, the first outer protective layer 85a and the first inner protective layer 86a are arranged in contact with each other at the rear end. Similarly, the second outer protective layer 85b and the second inner protective layer 86b are arranged in contact with each other at the rear end. Among the parts of the outer protective layer 85, the third and fourth outer protective layers 85c and 85d are arranged in contact with the third and fourth surfaces 102c and 102d, respectively, at only the rear end. The fifth outer protective layer 85e is not arranged in contact with the element body 102.

When viewed in a direction perpendicular to the first surface 102a, the first protective layer 84a overlaps the entirety of a region of the first surface 102a which extends from the front end of the element body 102 a distance L rearward of the element body 102 (see FIG. 3). The same applies to the second to fourth protective layers 84b to 84d. The same also applies to the first to fourth outer protective layers 85a to 85d and the first and second inner protective layers 86a and 86b. When viewed in a direction perpendicular to the fifth surface 102e (i.e., when viewed in the direction from front to rear), the fifth protective layer 84e overlaps the entirety of the fifth surface 102e. That is, the fifth protective layer 84e covers the entirety of the fifth surface 102e including the gas inlet 10. Since the protective layer 84 is a porous body, the measurement-object gas can flow inside the protective layer 84 and reach the gas inlet 10 and the inside of the measurement-object gas flow section 9.

The distance L illustrated in FIG. 3 is determined in the range of (0<Distance L<Longitudinal length of element body 102) on the basis of the region of the gas sensor 100 in which the element body 102 is exposed to the measurement-object gas, the position of the measurement-object gas flow section 9, and the like. The distance L is preferably determined so as to be larger than the length of the measurement-object gas flow section 9, which is formed inside the element body 102, in the front-rear direction. Since the longitudinal direction of the measurement-object gas flow section 9 is the same as the longitudinal direction (i.e., the front-rear direction) of the element body 102 as illustrated in FIGS. 2 to 4, the distance L is larger than the longitudinal length of the measurement-object gas flow section 9. In this embodiment, the length of the element body 102 in the front-rear direction, the width of the element body 102 in the left-right direction, and the thickness of the element body 102 in the top-bottom direction are different from one another as illustrated in FIG. 1 such that Length>Width>Thickness. The distance L is larger than either the width or thickness of the element body 102.

The protective layer 84 is composed of a porous body, such as an alumina porous body, a zirconia porous body, a spinel porous body, a cordierite porous body, a titania porous body, or a magnesia porous body. In this embodiment, the protective layer 84 is composed of an alumina porous body. The thickness of the protective layer 84 is, for example, but not limited to, 100 to 1000 µm. The porosity of the protective layer 84 is, for example, but not limited to, 5% to 85%. The thickness of the outer protective layer 85 may be, for example, 50 to 800 µm. The thickness of the inner protective layer 86 may be, for example, 5 to 50 µm. The thickness (height) of the internal space 90 may be, for example, 5 to 800 µm. The porosities, materials, etc. of the outer protective layer 85 and the inner protective layer 86 may be different from each other. At least one of the outer protective layer 85 and the inner protective layer 86 may include a plurality of sublayers.

The arithmetic average roughness Rap of the fifth inner peripheral surface 94e of the fifth internal space 90e is relatively high. Specifically, the above arithmetic average roughness Rap satisfies at least one of the following conditions: the arithmetic average roughness Rap is 8 µm or more, and the arithmetic average roughness Rap is higher than the arithmetic average roughness Rac of a bonding surface 97 of the protective layer 84 at which the protective layer 84 is bonded to the element body 102. This creates a turbulent flow in the fifth internal space 90e and consequently reduces variations in the NOx concentration detected by the sensor element 101. Details are described below. In this embodiment, since the fifth inner peripheral surface 94e includes only a fifth outside inner peripheral surface 95e that is an inner (element body 102-side) surface of the fifth outer protective layer 85e (see FIG. 3), the arithmetic average roughness Ra of the fifth outside inner peripheral surface 95e is used as an arithmetic average roughness Rap. In this embodiment, since the bonding surface 97 includes a first bonding surface 97a that is a bonding surface at which the first inner protective layer 86a is bonded on the first surface 102a and a second bonding surface 97b that is a bonding surface at which the second inner protective layer 86b is bonded on the second surface 102b, the average of the arithmetic average roughness values Ra of the first and second bonding surfaces 97a and 97b is used as an arithmetic average roughness Rac. In this embodiment, the arithmetic average roughness Rap satisfies both of the two conditions described above.

The arithmetic average roughness Rap is preferably 10 µm or more. When the arithmetic average roughness Rap is 10 µm or more, variations in the NOx concentration detected by the sensor element 101 may be further reduced. The arithmetic average roughness Rap may be 20 µm or more or may be 30 µm or more. The arithmetic average roughness Rap may be 100 µm or less. The arithmetic average roughness Rac may be 0.1 µm or more and 1.0 µm or less. When the arithmetic average roughness Rac is 0.1 µm or more, the adhesion strength between the element body 102 and the protective layer 84 can be maintained at a certain level. When the arithmetic average roughness Rac is 1.0 µm or less, the strength of the protective layer 84 can be maintained at a certain level.

The arithmetic average roughness Rap is determined by cutting the protective layer 84 such that the inner peripheral surface that is to be measured (i.e., the fifth outside inner peripheral surface 95e) is exposed and subsequently conducting measurement in accordance with a method adhering to JIS B 0601:2013 using a spectrointerferometer. The arithmetic average roughness Rac is determined by the following method. First, a observation sample is prepared by cutting the sensor element 101 such that a cross section perpendicular to the bonding surface 97 serves as an observation surface, then embedding the cross section in a resin, and polishing the cross section. Subsequently, an image of the observation surface of the observation sample is taken with a scanning electron microscope (SEM) at a 300-fold magnification and a field of view of about 350 µm×250 µm. On the basis of the brightness data of pixels of the obtained image, a histogram of brightness values of all the pixels is prepared. The brightness values corresponding to the portions (valleys) between the three peaks of the histogram are used as thresholds. The brightness value of each pixel is converted into a ternary representation by comparing the brightness of the pixel with the thresholds. Thereby, for each of the pixels, whether the pixel corresponds to the particles constituting the protective layer 84, the pores present in the protective layer 84, or the element body 102 is determined. Subsequently, the boundary line between the particles constituting the protective layer 84 and the element body 102 is drawn. This boundary line is used as a "surface profile of real surface" of the bonding surface 97 defined in JIS B 0601:2013. An arithmetic average roughness Ra determined by performing an image processing of the surface profile of real surface in accordance with a method adhering to JIS B 0601:2013 is used as an arithmetic average roughness Rac.

The arithmetic average roughness of the inner peripheral surfaces of the first to fourth internal spaces 90a to 90d, which are directly communicated with the fifth internal space 90e, is preferably relatively high. Specifically, it is preferable that the arithmetic average roughness Ras of the first to fourth inner peripheral surfaces 94a to 94d of the first to fourth internal spaces 90a to 90d satisfy at least one of the following conditions: the arithmetic average roughness Ras is 8 µm or more, and the arithmetic average roughness Ras is higher than the arithmetic average roughness Rac. Hereinafter, the arithmetic average roughness values Ras of the first to fourth inner peripheral surfaces 94a to 94d are referred to as "arithmetic average roughness values Ra1s to Ra4s", respectively. In this case, it is preferable that one or more of the arithmetic average roughness values Ra1s to Ra4s satisfy at least one of the two conditions described above.

The arithmetic average roughness Ra1s is described below. In this embodiment, the first inner peripheral surface 94a includes a first outside inner peripheral surface 95a that is an inner (element body 102-side) surface of the first outer protective layer 85a and a first inside inner peripheral surface 96a that is an outer (first internal space 90a-side) surface of the first inner protective layer 86a (see FIG. 3). In this case, when the arithmetic average roughness Ra of at least one of the first outside inner peripheral surface 95a and the first inside inner peripheral surface 96a is defined as arithmetic average roughness Ra1s, the arithmetic average roughness Ra1s preferably satisfies at least one of the two conditions described above. In other words, it is preferable that the arithmetic average roughness Ra of at least one of the first outside inner peripheral surface 95a and the first inside inner peripheral surface 96a satisfy at least one of the two conditions described above. In this embodiment, the arithmetic average roughness Ra (=Ra1s) of the first outside inner peripheral surface 95a satisfies both of the two conditions.

The arithmetic average roughness Ra2s is described below. In this embodiment, the second inner peripheral surface 94b includes a second outside inner peripheral surface 95b that is an inner (element body 102-side) surface of the second outer protective layer 85b and a second inside inner peripheral surface 96b that is an outer (second internal space 90b-side) surface of the second inner protective layer 86b (see FIG. 3). In this case, similarly to the arithmetic average roughness Ra1s, when the arithmetic average roughness Ra of at least one of the second outside inner peripheral surface 95b and the second inside inner peripheral surface 96b is defined as an arithmetic average roughness Ra2s, the arithmetic average roughness Ra2s preferably satisfies at least one of the two conditions described above. In this embodiment, the arithmetic average roughness Ra (=Ra2s) of the second outside inner peripheral surface 95b satisfies both of the two conditions.

The arithmetic average roughness Ra3s is described below. In this embodiment, the third inner peripheral surface 94c includes only a third outside inner peripheral surface 95c that is an inner (element body 102-side) surface of the third outer protective layer 85c (see FIG. 4). Therefore, the arithmetic average roughness Ra of the third outside inner peripheral surface 95c is defined as an arithmetic average roughness Ra3s. Similarly, the fourth inner peripheral surface 94d includes only a fourth outside inner peripheral surface 95d that is an inner (element body 102-side) surface of the fourth outer protective layer 85d (see FIG. 4). Therefore, the arithmetic average roughness Ra of the fourth outside inner peripheral surface 95d is defined as an arithmetic average roughness Ra4s. In this embodiment, each of the arithmetic average roughness values Ra3s and Ra4s satisfies both of the two conditions.

Similarly to the arithmetic average roughness Rap, the arithmetic average roughness values Ra1s to Ra4s are each determined by cutting the protective layer 84 such that the inner peripheral surface that is to be measured (i.e., a corresponding one of the first to fourth outside inner peripheral surfaces 95a to 95d) is exposed and subsequently conducting measurement in accordance with a method adhering to JIS B 0601:2013 using a spectrointerferometer.

As illustrated in FIGS. 3 and 4, the first to fifth inner peripheral surfaces 94a to 94e are all the inner (element body 102-side) surface of the outer protective layer 85. Therefore, in this embodiment, the arithmetic average roughness values Ra1s to Ra4s are set to be equal to one another and the arithmetic average roughness Rap is set to be equal to the arithmetic average roughness values Ra1s to Ra4s. However, the arithmetic average roughness values Rap and Ra1s to Ra4s may be different from one another. The arithmetic average roughness Ras (specifically, one or more of the arithmetic average roughness values Ra1s to Ra4s) may be 10 µm or more, 20 µm or more, or 30 µm or more. The arithmetic average roughness Ras may be 100 µm or less.

A method for producing the above-described gas sensor 100 is described below. In the method for producing the gas sensor 100, first, an element body 102 is produced. Subsequently, a protective layer 84 is formed on the element body 102 to produce a sensor element 101.

A method for producing the element body 102 is described below. First, six unbaked ceramic green sheets are prepared. A plurality of sheet holes used for performing positioning when printing is performed or the green sheets are stacked on top of one another, necessary through-holes, and the like are formed in each of the green sheets in accordance with a corresponding one of the layers 1 to 6. A space that is to serve as a measurement-object gas flow section 9 is formed, by punching or the like, in the green sheet that is to be formed into a spacer layer 5. Then, patterns such as electrodes and heaters are printed on each of the ceramic green sheets. Subsequent to the formation of the above patterns, the green sheets are dried. Subsequently, the green sheets are stacked on top of one another to form a layered body. A vanishing body (organic material, such as carbon or theobromine) capable of vanishing during baking may be charged into a part of the layered body which is to serve as a space such as a measurement-object gas flow section 9. The above layered body includes a plurality of element bodies 102. The layered body is cut into pieces having a size of the element body 102, which are then baked at a predetermined baking temperature. Hereby, an element body 102 is produced.

A method for forming a protective layer 84 on the element body 102 is described below. First, an inner protective layer 86 is formed on the surface of the element body 102. For forming the inner protective layer 86, various methods such as mold casting, screen printing, dipping, and plasma spraying may be used. In the case where the inner protective layer 86 is formed by screen printing or plasma spraying, the first to fifth inner protective layers 86a to 86e may be formed one by one. Subsequently, a vanishing body is applied to the inner protective layer 86, and the resulting coating film is dried to form a vanishing body having a shape of the internal space 90. The application of the vanishing body may be performed using screen printing, gravure printing, ink-jet printing, or the like. The vanishing body may be formed by repeatedly performing the above application and drying steps. Examples of the material of the vanishing body include the above-described organic materials, such as carbon and theobromine, and thermally degradable polymers, such as a vinyl resin. Subsequently, an outer protective layer 85 is formed on the outer surfaces of the inner protective layer 86 and the vanishing body. The outer protective layer 85 can be formed as in the formation of the inner protective layer 86. Hereby, a protective layer 84 including a vanishing body having a shape of the internal space 90 is formed. Then, the vanishing body is vanished by performing combustion. As a result, the part in which the vanishing body was present serves as an internal space 90. That is, a protective layer 84 having an internal space 90 formed therein is formed. In the above-described manner, a protective layer 84 is formed on the element body 102 and, hereby, a sensor element 101 is produced. In the case where the protective layer 84 is formed by mold casting, screen printing, or dipping, a slurry that is to form the outer protective layer 85 and the inner protective layer 86 is solidified or dried and then baked to form a protective layer 84. In such a case, the baking of the protective layer 84 and the combustion of the vanishing body may be performed simultaneously. In the case where the outer protective layer 85 and the inner protective layer 86 are formed by plasma spraying, the vanishing body may be vanished by performing combustion subsequent to the formation of the above two protective layers.

For setting the arithmetic average roughness values Rap and Ras to be relatively high, for example, the following methods may be used. First, a method in which the arithmetic average roughness Ra of the first to fifth outside inner peripheral surfaces 95a to 95e is increased in order to set the arithmetic average roughness values Rap and Ras to be relatively high is described below. In this case, for example, the outer protective layer 85 is formed by plasma spraying and the velocity at which the particles constituting the outer protective layer 85 are impinged onto the vanishing body is set to be relatively low by reducing the amount of gas used for generating plasma in plasma spraying or by increasing the distance between a plasma gun and the element body 102. This reduces the likelihood of the particles constituting the outer protective layer 85 being crushed and flattened upon collision with the vanishing body and consequently increases the arithmetic average roughness Ra of the first to fifth outside inner peripheral surfaces 95a to 95e. Alternatively, using a vanishing body composed of a soft material also reduces the likelihood of the particles constituting the outer protective layer 85 being crushed upon collision with the vanishing body and consequently increases the arithmetic average roughness Ra of the first to fifth outside inner peripheral surfaces 95a to 95e. Increasing the size of particles of a powder spray material (raw-material powder particles that are the particles constituting the outer protective layer 85) used in plasma spraying also increases the arithmetic average roughness Ra of the first to fifth outside inner peripheral surfaces 95a to 95e. For increasing the arithmetic average roughness Ra of the first and second inside inner peripheral surfaces 96a and 96b, for example, the inner protective layer 86 is formed so as to include a plurality of sublayers stacked on top of one another in the thickness direction and the size of the particles constituting a sublayer exposed to the internal space 90 is set to be larger than the size of the particles constituting a sublayer bonded to the element body 102. Alternatively, subsequent to the formation of the inner protective layer 86, the first and second inside inner peripheral surfaces 96a and 96b may be roughened in order to increase the arithmetic average roughness Ra.

In the case where the protective layer 84 includes a plurality of sublayers in the thickness direction (i.e., the outer protective layer 85 and the inner protective layer 86), the innermost later (i.e., the inner protective layer 86) is preferably formed by forming the slurry on the surface of the element body 102 by mold casting, screen printing, dipping, or the like and then baking the slurry together with the element body 102 in an integrated manner in order to form an inner protective layer 86. Since the surface of the element body 102 has a relatively small arithmetic average roughness Ra in many cases, the adhesion between the element body 102 and the inner protective layer 86, which is directly bonded to the element body 102, is likely small. Baking the slurry and the element body 102 in an integrated manner increases the adhesion between the element body 102 and the inner protective layer 86. A surface of the inner protective layer 86 which is to come into contact with the outer protective layer 85 (i.e., a rear-end part of the surface of the inner protective layer 86) preferably has a larger arithmetic average roughness Ra than the surface of the element body 102. In such a case, the adhesion between the inner protective layer 86 and the outer protective layer 85 can be increased. The arithmetic average roughness Ra of the surface of the inner protective layer 86 which is to come into contact with the outer protective layer 85 may be 1 μm or more and 10 μm or less and may be 1 μm or more and 5 μm or less. In addition to the surface of the inner protective layer 86 which is to come into contact with the outer protective layer 85, a first inside inner peripheral surface 96a and a second inside inner peripheral surface 96b which are to be exposed to the internal space 90 may have an arithmetic average roughness Ra of 1 μm or more and 10 μm or less or an arithmetic average roughness Ra of 1 μm or more and 5 μm or less.

When the outer protective layer 85 is prepared, the entirety of the outer protective layer 85 (the first to fifth outer protective layers 85a to 85e) may be integrally formed as a protective layer having a cap-like shape (also referred to as "bottomed cylindrical shape" or "shape of a box with one side open"). For example, the outer protective layer 85 may be prepared by forming a cap-like unbaked body having a shape of the outer protective layer 85 by mold casting, inserting the front end-side part of the element body 102 (in the case where the inner protective layer 86 is present, the element body 102 and the inner protective layer 86) into the inside of the cap-like unbaked body, and subsequently baking the unbaked body. In the above case, forming the unbaked body in a shape having a space holding portion, such as a columnar or step-like portion, formed therein (therefore, the outer protective layer 85, which is produced by baking the unbaked body, has a space holding portion) enables the internal space 90 to be formed between the outer protective layer 85 and the element body 102 without using the vanishing body having a shape of the internal space 90 but using the space holding portion. In the case where the outer protective layer 85 is prepared by the method in which the element body 102 is inserted into the cap-like unbaked body, the internal space 90 formed between the outer protective layer 85 and the element body 102 may have an opening directed toward the rear end of the element body 102. In such a case, a sealing portion may be formed by plasma spraying or the like so as to block the opening. The sealing portion is preferably a porous body the principal constituent of which is the same as that of the outer protective layer 85. It is possible to adjust the arithmetic average roughness values Rap and Ras by changing the shape of irregularities present in the surface (surface roughness) of a die used for preparing the unbaked body that is to be formed into the outer protective layer 85.

After the sensor element 101 has been produced in the above-described manner, it is placed in a predetermined housing, which is then attached to a main body (not illustrated in the drawing) of a gas sensor 100 and connected to power supplies, etc. Hereby, a gas sensor 100 is produced.

While the above-described gas sensor 100 is used, a measurement-object gas present inside a piping reaches the sensor element 101 and enters the gas inlet 10 through the protective layer 84. The sensor element 101 detects the NOx concentration in the measurement-object gas passed into the measurement-object gas flow section 9 through the gas inlet 10 on the basis of the voltage (i.e., electromotive force V2) between the measurement electrode 44 and the reference electrode 42. For example, the value representing the specific gas concentration is obtained by the sensor element 101 outputting (measuring) the electromotive force V2 or the pump current Ip2 that flows when the voltage Vp2 is controlled such that the electromotive force V2 is constant.

In the sensor element 101 according to this embodiment, the arithmetic average roughness Rap of the fifth inner peripheral surface 94e (i.e., the fifth outside inner peripheral surface 95e) of the inlet protective layer (i.e., the fifth protective layer 84e) satisfies at least one of the conditions below: the arithmetic average roughness Rap is 8 μm or more, and the arithmetic average roughness Rap is higher than the arithmetic average roughness Rac of the bonding surface 97 of the protective layer 84 at which the protective layer 84 is bonded to the element body 102. That is, the fifth outside inner peripheral surface 95e has a relatively high arithmetic average roughness Rap, that is, relatively large irregularities formed therein. Consequently, when a measurement-object gas is passed from the outside of the protective layer 84 to the gas inlet 10 through the fifth internal space 90e, the irregularities present in the fifth outside inner peripheral surface 95e causes the flow of the measurement-object gas in the fifth internal space 90e to be converted into a turbulent flow. The turbulent flow stirs the measurement-object gas and thereby increases the uniformity in the NOx concentration in the measurement-object gas. As a result, variations in the NOx concentration in the measurement-object gas introduced into the measurement-object gas flow section 9 are reduced and, accordingly, fluctuations in the electromotive force V2 between the measurement electrode 44 and the reference electrode 42 which are caused due to the variations in the NOx concentration are reduced. Thus, variations in the NOx concentration detected by the sensor element 101 can be reduced.

In the gas sensor 100 according to this embodiment described above in detail, the sensor element 101 includes a measurement electrode 44 disposed on the inner peripheral surface of the measurement-object gas flow section 9 and a reference electrode 42 exposed to a reference gas (i.e., air) used as a reference for detecting a specific gas concentration (i.e., NOx concentration). The sensor element 101 includes an inlet protective layer (i.e., the fifth protective layer 84e) covering a gas inlet 10 formed in the surface of the element body 102, which is an inlet of the measurement-object gas flow section 9, and at least a part of the fifth surface 102e in which the gas inlet 10 is formed. Furthermore, the arithmetic average roughness Rap of the fifth inner peripheral surface 94e (i.e., the fifth outside inner peripheral surface 95e) of the fifth internal space 90e of the fifth protective layer 84e satisfies at least one of the conditions below: the arithmetic average roughness Rap is 8 μm or more, and the arithmetic average roughness Rap is higher than the arithmetic average roughness Rac of the bonding surface 97 of the protective layer 84 at which the protective layer 84 is bonded to the element body 102. That is, the fifth outside inner peripheral surface 95e has a relatively high arithmetic average roughness Rap. This reduces variations in the NOx concentration detected by the sensor element 101.

If the arithmetic average roughness Rap is higher than 100 the irregularities present in the fifth inner peripheral surface 94e (i.e., the fifth outside inner peripheral surface 95e) of the fifth internal space 90e of the inlet protective layer (i.e., the fifth protective layer 84e) increase resistance to the flow of a measurement-object gas and reduce the likelihood of the measurement-object gas reaching the gas inlet 10. This may reduce the responsivity of the sensor element 101. When the arithmetic average roughness Rap is 100 μm or less, the reduction in responsivity can be prevented.

When the arithmetic average roughness Rap is 10 or more, variations in the NOx concentration detected by the sensor element 101 may be further reduced. When the arithmetic average roughness Rac is 0.1 μm or more, the adhesion strength between the element body 102 and the protective layer 84 can be maintained at a certain level. When the arithmetic average roughness Rac is 1.0 μm or less, the strength of the protective layer 84 can be maintained at a certain level.

Furthermore, the surface of the element body 102 includes a fifth surface 102e in which the gas inlet 10 is formed and a plurality of adjacent faces (i.e., the first to fourth surfaces 102a to 102d) that each meet the fifth surface 102e along a side of the fifth surface 102e. The protective layer 84 includes adjacent-face protective layers (i.e., the first to fourth protective layers 84a to 84d) that cover the first to fourth surfaces 102a to 102d, respectively. The first to fourth protective layer 84a to 84d have first to fourth internal spaces 90a to 90d formed therein, respectively, the first to fourth internal spaces 90a to 90d being directly communicated with the fifth internal space 90e of the fifth protective layer 84e. The arithmetic average roughness Ras (i.e., each of the arithmetic average roughness values Ra1s to Ra4s) of the inner peripheral surfaces (i.e., the first to fourth inner peripheral surfaces 94a to 94d) of the first to fourth internal spaces 90a to 90d satisfies at least one of the conditions below: the arithmetic average roughness Ras is 8 or more, and the arithmetic average roughness Ras is higher than the arithmetic average roughness Rac. While the sensor element 101 is used, moisture included in the measurement-object gas may adhere onto the surface of the sensor element 101. Since the temperature of the element body 102 is adjusted to be the temperature (e.g., 800° C.) at which the solid electrolyte is activated by the heater 72 as described above, a quick reduction in the temperature of the element body 102 caused by the moisture adhered may result in cracking of the element body 102 due to thermal shock. In the sensor element 101 according to this embodiment, the presence of the first to fourth protective layers 84a to 84d avoids a sudden reduction in the temperature of the element body 102. This enhances the waterproofing performance of the element body 102. In addition, since the first to fourth protective layers 84a to 84d have the first to fourth internal spaces 90a to 90d, respectively, the conduction of heat from the outside of the first to fourth protective layers 84a to 84d toward the element body 102 in the thickness directions of the first to fourth protective layers 84a to 84d can be suppressed by the first to fourth internal spaces 90a to 90d, respectively. This further enhances the waterproofing performance of the element body 102. Moreover, since the first to fourth internal spaces 90a to 90d and the fifth internal space 90e are directly communicated with one another, the first to fourth internal spaces 90a to 90d are relatively wide. This further enhances the waterproofing performance of the element body 102. Furthermore, the arithmetic average roughness Ras of the first to fourth inner peripheral surfaces 94a to 94d of the first to fourth internal spaces 90a to 90d satisfies at least one of the conditions below: the arithmetic average roughness Ras is 8 μm or more, and the arithmetic average roughness Ras is higher than the arithmetic average roughness Rac. In other words, the first to fourth protective layers 84a to 84d have first to fourth internal spaces 90a to 90d having first to fourth inner peripheral surfaces 94a to 94d having a relatively high arithmetic average roughness Ras, respectively. Thus, the irregularities of the first to fourth internal spaces 90a to 90d cause the flow of the measurement-object gas in the first to fourth internal spaces 90a to 90d to become turbulent. This reduces the likelihood of a measurement-object gas moving from the fifth internal space 90e to the first to fourth internal spaces 90a to 90d. This enables the measurement-object gas present in the fifth internal space 90e to readily enter the measurement-object gas flow section 9 from the gas inlet 10. This increases the responsivity of the sensor element 101. That is, while the first to fourth internal spaces 90a to 90d and the fifth internal space 90e are directly communicated with one another in order to enhance the waterproofing performance of the element body 102, a reduction in responsivity which may occur when the above internal spaces are directly communicated with one another can be limited by setting the arithmetic average roughness Ras to be relatively high.

The element body 102 is a layered body including a plurality of layers composed of a solid electrolyte body, the layers being stacked on top of one another in a stacking direction (the top-bottom direction) perpendicular to the longitudinal direction. Furthermore, the surface of the element body 102 includes the fifth surface 102e that is an end surface of the element body 102 in the longitudinal direction and a plurality of adjacent faces (i.e., the first to fourth surfaces 102a to 102d) that each meet the fifth surface 102e along a side of the fifth surface 102e. The protective layer 84 includes adjacent-face protective layers (i.e., the first to fourth protective layers 84a to 84d) that cover the first to fourth surfaces 102a to 102d, respectively. The parts (i.e., the first and second protective layers 84a and 84b) of the first to fourth protective layers 84a to 84d which each cover a specific one of the top surface (i.e., the first surface 102a) and the bottom surface (i.e., the second surface 102b) included in the first to fourth surfaces 102a to 102d, the top and bottom surfaces being located at respective ends of the element body 102 in the stacking direction, have first and second internal spaces 90a to 90b formed therein, respectively, and include first and second outer protective layers 85a and 85b arranged closer to the outside than the first and second internal spaces 90a and 90b, respectively, and first and second inner protective layers 86a and 86b arranged closer to the inside than the first and second internal spaces 90a and 90b, respectively, the first and second inner protective layers 86a and 86b being bonded on the surface of the element body 102. The presence of the first and second inner protective layers 86a and 86b arranged in contact with the first surface 102a and the second surface 102b increases the thermal capacity of the element body 102 (to be exact, the element body 102 and the first and second inner protective layers 86a and 86b). Therefore, even if a thermal shock transmits from the outside to the element body 102, a sudden change in the temperature of the element body 102 can be avoided. This enhances the waterproofing performance of the element body 102.

It is needless to say that the present invention is not limited to the foregoing embodiment and may be implemented in various aspects within the technical scope of the present invention.

Figure 5:
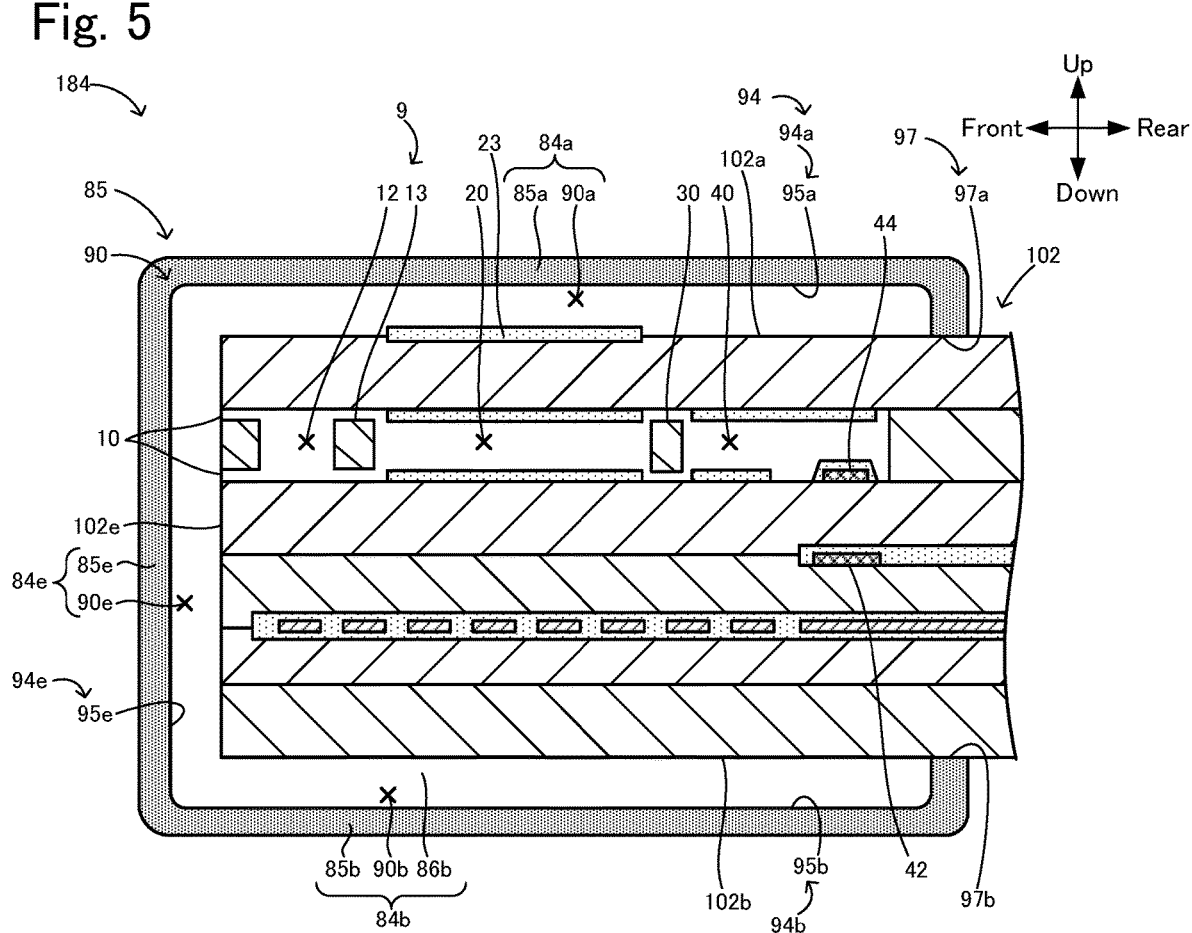
FIG. 5 is a cross-sectional view of a protective layer 184 according to a modification example.

For example, although the protective layer 84 includes the inner protective layer 86 in the above-described embodiment, the protective layer 84 does not necessarily include the inner protective layer 86. FIG. 5 is a cross-sectional view of a protective layer 184 according to a modification example corresponding to the above case. The protective layer 184 includes an outer protective layer 85 and an internal space 90. The surfaces of the element body 102, that is, the first to fifth surfaces 102a to 102e, are exposed to the internal space 90. In this case, the bonding surface 97 of the protective layer 184 is a bonding surface of the outer protective layer 85 at which the outer protective layer 85 is bonded to the element body 102 (e.g., the first and second bonding surfaces 97a and 97b illustrated in FIG. 5), and the arithmetic average roughness Rac is determined on the basis of the bonding surface 97.

Although the inner protective layer 86 includes the first and second inner protective layers 86a and 86b in the above-described embodiment, the present invention is not limited to this. The inner protective layer 86 is arranged to cover at least one of the first to fifth surfaces 102a to 102e. For example, similarly to the protective layer 284 illustrated in FIGS. 6 and 7 according to an modification example, the inner protective layer 86 may include first to fifth inner protective layers 86a to 86e that cover the first to fifth surfaces 102a to 102e, respectively. In the protective layer 284, the third to fifth inner peripheral surfaces 94c to 94e include third to fifth outside inner peripheral surfaces 95c to 95e and third to fifth inside inner peripheral surfaces 96c to 96e, respectively. In this case, since the bonding surface 97 of the protective layer 284 is a bonding surface of the inner protective layer 86 at which the inner protective layer 86 is bonded to the element body 102 (the first to fifth bonding surfaces 97a to 97e illustrated in FIGS. 6 and 7), the arithmetic average roughness Rac is determined on the basis of the bonding surface 97. Specifically, in the example illustrated in FIGS. 6 and 7, the average of the arithmetic average roughness values Ra of the first to fifth bonding surfaces 97a to 97e is used as an arithmetic average roughness Rac. In the example illustrated in FIGS. 6 and 7, since the fifth surface 102e is covered with the fifth inner protective layer 86e, either the fifth surface 102e or the gas inlet 10 is not exposed to the fifth internal space 90e.

Although the first to fifth internal spaces 90a to 90e are directly communicated with one another in the above-described embodiment, the present invention is not limited to this. For example, the fifth internal space 90e may be directly communicated with at least one of the first to fourth internal spaces 90a to 90d and is not necessarily directly communicated with any of the first to fourth internal spaces 90a to 90d.

Although the first to fifth protective layers 84a to 84e each have one internal space in the above-described embodiment, the present invention is not limited to this; each of the first to fifth protective layers 84a to 84e may have two or more internal spaces. In the case where a plurality of fifth internal spaces 90e are present, the arithmetic average roughness Ra of the inner peripheral surface of one of the plurality of fifth internal spaces 90e which is closest to the gas inlet 10 is used as an arithmetic average roughness Rap.

Although the protective layer 84 includes the first to fifth protective layers 84a to 84e in the above-described embodiment, the protective layer 84 includes at least the inlet protective layer (in the above-described embodiment, the fifth protective layer 84e). The protective layer 84 does not necessarily include the adjacent-face protective layer (in the above-described embodiment, the first to fourth protective layers 84a to 84d) and may include at least one adjacent-face protective layer.

Although the longitudinal direction of the measurement-object gas flow section 9 is parallel to that of the element body 102 in the above-described embodiment, the present invention is not limited to this. Although the gas inlet 10 of the measurement-object gas flow section 9 is formed in the fifth surface 102e in the above-described embodiment, the gas inlet 10 may be formed in the other surfaces, such as the first surface 102a. In other words, the inlet protective layer is not limited to the fifth protective layer 84e.

Although the element body 102 is rectangular parallelepiped in the above-described embodiment, the present invention is not limited to this. For example, the element body 102 may have an elongate shape having a longitudinal direction. For example, the element body 102 may have a shape of a polygonal column or a cylinder.

Although not mentioned in the above-described embodiment, each of the first to fifth internal spaces 90a to 90e formed in the protective layer 84 are distinguishable in size from the pores present in the components (e.g., the outer protective layer 85 and the inner protective layer 86) of the protective layer 84. That is, the pores present in the outer protective layer 85 and the inner protective layer 86 are not included in the internal space 90. The internal space 90 (each of the first to fifth internal spaces 90a to 90e) is a space that is different from and larger than the pores present in the protective layer 84. For example, the volume of a part of the first internal space 90a which is present in a region immediately above the first surface 102a may be 0.03 mm$^3$ or more, 0.04 mm$^3$ or more, 0.07 mm$^3$ or more, 0.5 mm$^3$ or more, or 1.5 mm$^3$ or more. The volume of a part of the second internal space 90b which is present in a region immediately below the second surface 102b may be 0.03 mm$^3$ or more, 0.04 mm$^3$ or more, 0.07 mm$^3$ or more, 0.5 mm$^3$ or more, or 1.5 mm$^3$ or more. The volume of a part of the third internal space 90c which is present in a region left of the third surface 102c may be 0.015 mm$^3$ or more, 0.2 mm$^3$ or more, or 0.4 mm$^3$ or more. The volume of a part of the fourth internal space 90d which is present in a region right of the fourth surface 102d may be 0.015 mm$^3$ or more, 0.2 mm$^3$ or more, or 0.4 mm$^3$ or more. The volume of a part of the fifth internal space 90e which is present in a region forward of the fifth surface 102e may be 0.010 mm$^3$ or more, 0.1 mm$^3$ or more, 0.2 mm$^3$ or more, or 0.3 mm$^3$ or more. Note that the expression "region immediately above the first surface 102a" means a region that extends from the first surface 102a in a direction perpendicular to the first surface 102a, which does not include a region above and left of the first surface 102a, a region above and right of the first surface 102a, and the like. The same applies to the expressions "region immediately below the second surface 102b", "region left of the third surface 102c", "region right of the fourth surface 102d", and "region forward of the fifth surface 102e". In the case where the first internal space 90a includes a plurality of spaces, the volume of a part of at least one of the spaces which is present in the region immediately above the first surface 102a may be 0.03 mm$^3$ or more, 0.04 mm$^3$ or more, 0.07 mm$^3$ or more, 0.5 mm$^3$ or more, or 1.5 mm$^3$ or more. Alternatively, the total of the volumes of parts of the spaces which are present in the region immediately above the first surface 102a may be 0.03 mm$^3$ or more, 0.04 mm$^3$ or more, 0.07 mm$^3$ or more, 0.5 mm$^3$ or more, or 1.5 mm$^3$ or more. Similarly, for each of the second to fifth internal spaces 90b to 90e, in the case where the internal space includes a plurality of spaces, at least one of the spaces may satisfy the above volume range. Alternatively, the spaces may satisfy the above volume range in terms of the total of the spaces. The height of the first internal space 90a may be 40% or more and 70% or less of the distance from the first surface 102a to the top surface of the first outer protective layer 85a. Similarly, the height of the second internal space 90b may be 40% or more and 70% or less of the distance from the second surface 102b to the bottom surface of the second outer protective layer 85b. The height of the third internal space 90c may be 40% or more and 70% or less of the distance from the third surface 102c to the left surface of the third outer protective layer 85c. The height of the fourth internal space 90d may be 40% or more and 70% or less of the distance from the fourth surface 102d to the right surface of the fourth outer protective layer 85d. The height of the fifth internal space 90e may be 40% or more and 70% or less of the distance from the fifth surface 102e to the front surface of the fifth outer protective layer 85e. The height of the first internal space 90a may be 5 times or more or 10 times or more the average pore size (by mercury intrusion porosimetry) of the protective layer 84. Similarly, the heights of the second to fifth internal spaces 90b to 90e may be 5 times or more or 10 times or more the average pore size of the protective layer 84.

Although the element body 102 is a layered body including a plurality of solid electrolyte layers (the layers 1 to 6) in the above-described embodiment, the present invention is not limited to this. The element body 102 may be any layered body including at least one oxygen-ion-conductive solid electrolyte layer. For example, the layers 1 to 5, other than the second solid electrolyte layer 6, in FIG. 2 may be structure layers composed of a material other than a solid electrolyte (e.g., layers composed of alumina). In such a case, the electrodes included in the element body 102 are disposed in the second solid electrolyte layer 6. For example, the measurement electrode 44 illustrated in FIG. 2 is disposed on the bottom surface of the second solid electrolyte layer 6. Furthermore, the reference-gas introduction space 43 is formed in the spacer layer 5, but not in the first solid electrolyte layer 4, the air introduction layer 48 is interposed between the second solid electrolyte layer 6 and the spacer layer 5, but not between the first solid electrolyte layer 4 and the third substrate layer 3, and the reference electrode 42 is disposed on the bottom surface of the second solid electrolyte layer 6 at a position rearward of the second internal space 40.

Although a gas sensor 100 that detects NOx concertation is described as an example in the above-described embodiment, the present invention may be applied to a gas sensor that detects oxygen concentration and a gas sensor that detects ammonia concentration.

EXAMPLES

Examples where the above-described sensor element was specifically prepared are described below as Examples. Test Examples 2 to 11 correspond to Examples of the present invention, while Test Example 1 corresponds to Comparative Example. Note that the present invention is not limited by Examples below.

Test Example 1

In Test Example 1, a sensor element 101 having the structure illustrated in FIGS. 1 to 4 was prepared by the method described below. First, an element body 102 as described in FIGS. 1 to 4, which had a length of 67.5 mm, a width of 4.25 mm, and a thickness of 1.45 mm, was prepared. In the preparation of the element body 102, ceramic green sheets corresponding to the layers 1 to 6 were prepared by mixing zirconia particles including 4 mol % yttria serving as a stabilizer with an organic binder and an organic solvent and subsequently performing tape casting. Patterns of electrodes, etc. were printed on each of the six green sheets. A slurry that was to form an inner protective layer 86 (first and second inner protective layers 86a and 86b) after baking was formed, by screen printing, on a surface (surface that is to serve as a first surface 102a) of one of the six green sheets which was to serve as a second solid electrolyte layer 6 and on a surface (surface that is to serve as a second surface 102b) of one of the six green sheets which was to serve as a first substrate layer 1. The slurry used for forming the inner protective layer 86 was prepared by the following method. With 10 vol % of a raw-material powder (an alumina powder) having a particle size of D50=5 μm, 40 vol % of a binder solution (polyvinyl acetal and butyl carbitol), 45 vol % of a cosolvent (acetone), and 5 vol % of a dispersant (polyoxyethylene styrenated phenyl ether) were mixed. The resulting mixture was stirred with a pot mill mixer at a rotation speed of 200 rpm for 3 hours to form a paste. Subsequent to the printing of the patterns of electrodes, etc. and the slurry that was to form an inner protective layer 86, the six green sheets were stacked on top of one another and then baked. Hereby, an element body 102 including an inner protective layer 86 was prepared.

Subsequently, an internal space 90 and an outer protective layer 85 were formed on the element body 102 including the inner protective layer 86. Specifically, first, a vanishing body composed of a vinyl resin was formed on the first inner protective layer 86a, the second inner protective layer 86b, and the third to fifth surfaces 102c to 102e of the element body 102 by screen printing. The vanishing body was formed in a shape of the internal space 90 (first to fifth internal spaces 90a to 90e). Then, an outer protective layer 85 (first to fifth outer protective layers 85a to 85e) was formed on the surface of the vanishing body by plasma spraying with a plasma spray gun ("SinplexPro-90" produced by Oerlikon Metco). In the formation of the first outer protective layer 85a, plasma spraying was performed under the following conditions. A mixture of an argon gas (flow rate: 50 L/min) and hydrogen (flow rate: 2 L/min) was used as a gas for plasma generation. The voltage applied for plasma generation was a direct-current voltage of 100 V. The current was 200 A. The raw material particles (powder spray material) used to form the first outer protective layer 85a were alumina powder particles having an average particle size of 30 μm. The carrier gas used for feeding of the raw material particles was an argon gas (flow rate: 5 L/min). Plasma gun spraying was performed on the first surface 102a in a direction perpendicular to the first surface 102a. The distance between the plasma gun and the first surface 102a was 120 mm. Plasma spraying was performed in air atmosphere at normal temperature. The second to fifth outer protective layers 85b to 85e were formed by plasma spraying as in the formation of the first outer protective layer 85a. In the formation of the first to fifth outer protective layers 85a to 85e, plasma spraying was performed under the same conditions. After the first to fifth outer protective layers 85a to 85e had been formed in the above-described manner, the vanishing body was removed by combustion to form an internal space 90. Hereby, a sensor element 101 of Test Example 1 was prepared.

In the sensor element 101 prepared in Test Example 1, the first inner protective layer 86a and the second inner protective layer 86b had a thickness of 50 μm and a porosity of 50%. The arithmetic average roughness Rac of the bonding surface 97 of the first inner protective layer 86a and the second inner protective layer 86b which was measured by the above-described method was 1 The first to fifth outer protective layers 85a to 85e had a thickness of 200 μm and a porosity of 20%. The arithmetic average roughness values Ras (=Ra1s to Ra4s) of the first to fourth outside inner peripheral surfaces 95a to 95d which were measured by the above-described method with a spectrointerferometer (optical measuring device, Zygo) were all 1 The arithmetic average roughness Rap of the fifth outside inner peripheral surface 95e which was measured by the above-described method in the same manner was 1 The arithmetic average roughness Ras (=Ra1s to Ra4s) was calculated as the average of arithmetic average roughness values measured at the following three positions: the center of a corresponding one of the first to fourth outside inner peripheral surfaces 95a to 95d; and two positions that were 1 mm away from the above center in the longitudinal direction (the front-rear direction) of the sensor element 101. The arithmetic average roughness Rap was calculated as the average of arithmetic average roughness values measured at the following three positions: the center of the fifth outside inner peripheral surface 95e; and two positions that were 1 mm away from the above center. The thickness of the first and second internal spaces 90a and 90b (the distance between the outer protective layer 85 and the inner protective layer 86 in the thickness direction) was 200 The third to fifth internal spaces 90c to 90e had a thickness of 200 μm.

Test Examples 2 to 7

In Test Examples 2 to 7, a sensor element 101 was prepared as in Test Example 1, except that the arithmetic average roughness values Rap and Ras were set to be higher than those in Test Example 1 by changing the conditions under which plasma spraying was performed in the formation of the outer protective layer 85. The conditions for plasma spraying were changed as follows: in Test Example 2, the above-described distance was changed to 150 mm; in Test Example 3, the above distance was changed to 180 mm; in Test Example 4, the above distance was changed to 200 mm; in Test Example 5, the above distance was changed to 200 mm and the average particle size of the alumina powder was changed to 35 μm; in Test Example 6, the above distance was changed to 200 mm and the average particle size of the alumina powder was changed to 40 μm, and in Test Example 7, the above distance was changed to 200 mm and the average particle size of the alumina powder was changed to 50 In each of Test Examples 2 to 7, the arithmetic average roughness Rap was equal to the arithmetic average roughness Ras.

[Test for Evaluating Variations in Detected Value]

A gas sensor including the sensor element 101 prepared in Test Example 1 was attached to a piping constituting an automobile exhaust gas pipe. Subsequently, the temperature of the heater 72 was increased to 800° C. by energizing the heater 72, in order to heat the sensor element 101. Then, an automobile gasoline engine (1.8 L) was operated under predetermined operating conditions (engine rotation speed: 4500 rpm, air fuel ratio A/F: value 11.0, load torque: 130 N·m, gage pressure of automobile exhaust gas: 60 kPa, and temperature of automobile exhaust gas: 800° C.). Subsequently, the above-described pump cells 21, 41, and 50 were actuated in order to start measuring the NOx concentration with the sensor element 101. After a lapse of 10 seconds since the operation of the pump cells was started, the measurement of the pump current Ip2 (value corresponding to the NOx concentration in the automobile exhaust gas) was started. The above measurement was continued for 10 seconds. The difference between the maximum and minimum pump current values Ip2 measured during the above measurement period was derived as a value representing the degree of variations in the NOx concentration detected by the sensor element 101 (value detected by the sensor element 101). In Test Examples 2 to 7, the above value was derived in the same manner as described above. The values derived in Test Examples 2 to 7 were expressed on a percentage basis with the value derived in Test Example 1 being 100%. These percentages were used as the ratio of variations in the value detected by the sensor element 101.

Figure 8:
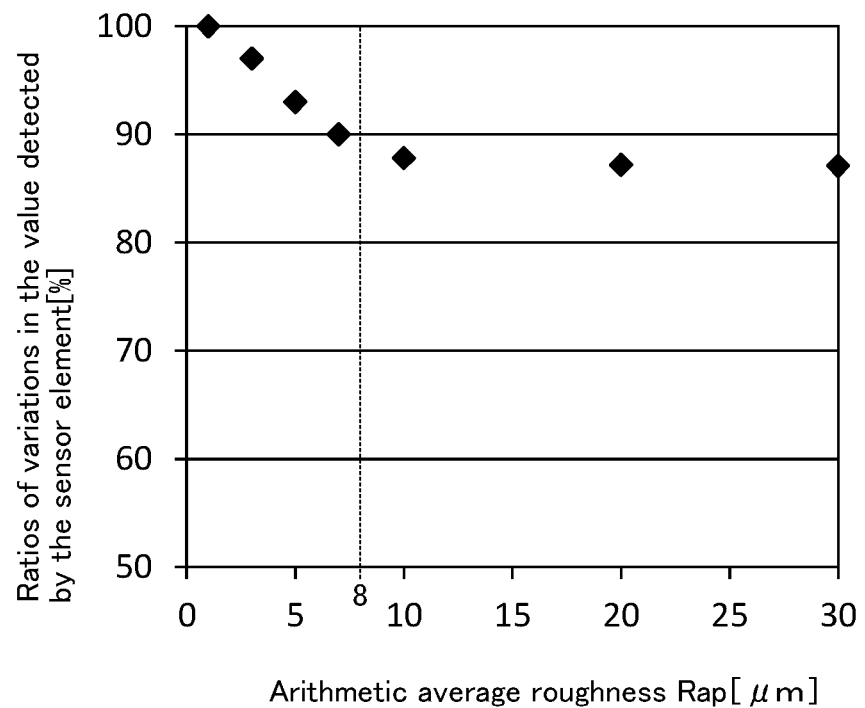
FIG. 8 is a graph illustrating the relationship between the arithmetic average roughness values Rap and the ratios of variations in the value detected by the sensor element 101 which were measured in Test Examples 1 to 7.

Table 1 lists the arithmetic average roughness values Rap, Rac, and Ras and the ratio of variations in the value detected by the sensor element 101 that were measured in each of Test Examples 1 to 7. FIG. 8 is a graph illustrating the relationship between the arithmetic average roughness values Rap and the ratios of variations in the value detected by the sensor element 101 which were measured in Test Examples 1 to 7.

TABLE 1

| | Arithmetic average roughness [μm] | | | Ratio of variations in the value detected by sensor element [%] |
|---|---|---|---|---|
| | Rap | Rac | Ras | |
| Test Example 1 | 1 | 1 | 1 | 100 |
| Test Example 2 | 3 | 1 | 3 | 97 |
| Test Example 3 | 5 | 1 | 5 | 93 |
| Test Example 4 | 7 | 1 | 7 | 90 |
| Test Example 5 | 10 | 1 | 10 | 87.8 |
| Test Example 6 | 20 | 1 | 20 | 87.2 |
| Test Example 7 | 30 | 1 | 30 | 87.1 |

The results listed in Table 1 and the results illustrated in FIG. 8 confirm that the ratio of variations in the value detected by the sensor element 101 was low in Test Examples 2 to 7, where Rap>Rac, compared with Test Example 1, where the arithmetic average roughness Rap was less than 8 μm and Rap=Rac. In Test Examples 1 to 7, the higher the arithmetic average roughness Rap, the lower the ratio of variations in the value detected by the sensor element 101. In the case where the arithmetic average roughness Rap was less than 8 μm (Test Examples 1 to 4), the ratio of variations in the value detected by the sensor element 101 sharply decreased with an increase in the arithmetic average roughness Rap, while the ratio of variations in the detected value substantially did not change with an increase in the arithmetic average roughness Rap in the case where the arithmetic average roughness Rap was 8 μm or more (Test Examples 5 to 7). Therefore, setting the arithmetic average roughness Rap to be 8 μm or more may reduce variations in the NOx concentration detected by the sensor element 101 by a sufficient degree.

Test Examples 8 to 11

In Test Examples 8 to 11, a sensor element 101 was prepared in which the conditions under which plasma spraying was performed in the formation of the first to fourth outer protective layers 85a to 85d were changed from the conditions under which plasma spraying was performed in the formation of the fifth outer protective layer 85e such that the arithmetic average roughness Rap and the arithmetic average roughness Ras were different from each other. Test Examples 8 to 11 were the same as Test Example 5, except the conditions under which plasma spraying was performed in the formation of the first to fourth outer protective layers 85a to 85d. In Test Examples 8, 9, 10, and 11, the conditions under which plasma spraying was performed in the formation of the first to fourth outer protective layers 85a to 85d were the same as those of Test Examples 2, 4, 5, and 6, respectively. Thus, in Test Example 10, a sensor element 101 was prepared under the same production conditions as in Test Example 5, including the conditions under which plasma spraying was performed in the formation of the first to fourth outer protective layers 85a to 85d.

[Test for Evaluating Responsivity]

A gas sensor including the sensor element 101 prepared in Test Example 8 was attached to a piping constituting an automobile exhaust gas pipe. Subsequently, the temperature of the heater 72 was increased to 800° C. by energizing the heater 72, in order to heat the sensor element 101. A model gas prepared by mixing a base gas, which was nitrogen, with a predetermined concentration of oxygen and 70 ppm of NO was used as a measurement-object gas. The measurement-object gas was passed through the piping at a flow rate of 9 m/s. Subsequently, the above-described pump cells 21, 41, and 50 were actuated in order to start measuring the NOx concentration with the sensor element 101. After the pump current Ip2 (value corresponding to the NOx concentration in the measurement-object gas) had become stable, a change in the pump current Ip2 with time which occurred when the NO concentration in the measurement-object gas passed through the piping was changed from 70 ppm to 500 ppm was examined. With the pump current Ip2 measured immediately before the NO concentration was changed being 0% and the pump current Ip2 measured after the pump current Ip2 had been changed and stabilized subsequent to the change in NO concentration being 100%, the amount of time that elapsed from when the pump current Ip2 exceeded 10% to when the pump current Ip2 exceeded 90% was defined as a response time (sec) in the detection of NOx concentration. The smaller the response time, the higher the responsivity of the sensor element 101. The response time was also measured in Test Examples 8 to 11 in the same manner as described above. In each test example, the measurement of the response time was conducted a plurality of times and the average thereof was used as a response time.

Table 2 lists the arithmetic average roughness values Rap, Rac, and Ras and the response time of the sensor element 101 that were measured in each of Test Examples 8 to 11.

TABLE 2

| | Arithmetic average roughness [μm] | | | Response time of sensor element [msec] |
|---|---|---|---|---|
| | Rap | Rac | Ras | |
| Test Example 8 | 10 | 1 | 3 | 2200 |
| Test Example 9 | 10 | 1 | 7 | 2000 |
| Test Example 10 | 10 | 1 | 10 | 1500 |
| Test Example 11 | 10 | 1 | 20 | 1400 |

The results listed in Table 2 confirm that the response time of the sensor element 101 was small in Test Examples 9 to 11, where Ras>Rac, compared with Test Example 8, where the arithmetic average roughness Ras was less than 8 μm and Ras=Rac. In Test Examples 8 to 11, the higher the arithmetic average roughness Ras, the smaller the response time of the sensor element 101. A comparison between the results obtained in Test Examples 8 to 11 confirms that the response time of the sensor element 101 sharply decreased in Test Examples 10 and 11, where the arithmetic average roughness Ras was 8 μm or more, compared with Test Examples 8 and 9, where the arithmetic average roughness Ras was less than 8 Therefore, setting the arithmetic average roughness Ras to be 8 μm or more may increase the responsivity of the sensor element 101 by a sufficient degree.

The present application is based upon and claims the benefit of priority of the prior Japanese Patent Application No. 2019-033351 filed on Feb. 26, 2019, and the prior Japanese Patent Application No. 2019-211703 filed on Nov. 22, 2019, which are incorporated herein by reference in their entirety.

What is claimed is:

1. A sensor element that detects a specific gas concentration in a measurement-object gas, the sensor element comprising:
   an element body including an oxygen-ion-conductive solid electrolyte body, the element body having a measurement-object gas flow section formed therein, the measurement-object gas flow section through which a measurement-object gas is introduced and flows;
   a measurement electrode disposed on an inner peripheral surface of the measurement-object gas flow section;
   a reference electrode disposed in the element body, the reference electrode being exposed to a reference gas used as a reference for detecting the specific gas concentration; and
   a porous protective layer arranged to cover a part of a surface of the element body,
   wherein the protective layer includes an inlet protective layer arranged to cover a gas inlet formed in the surface of the element body, the gas inlet being an inlet of the measurement-object gas flow section, and at least a part of a face included in the surface of the element body, the face on which the gas inlet is opens,
   wherein the inlet protective layer has an internal space formed therein, and
   wherein an arithmetic average roughness Rap of an inner peripheral surface of the internal space of the inlet protective layer satisfies at least one of conditions below: the arithmetic average roughness Rap is 8 μm or more, and the arithmetic average roughness Rap is higher than an arithmetic average roughness Rac of a bonding surface of the protective layer, the bonding surface at which the protective layer is bonded to the element body.

2. The sensor element according to claim 1, wherein the arithmetic average roughness Rap is 10 μm or more.

3. The sensor element according to claim 1, wherein the arithmetic average roughness Rac is 0.1 μm or more and 1.0 μm or less.

4. The sensor element according to claim 1, wherein the surface of the element body includes the face on which the gas inlet opens and one or more adjacent faces that each meet the face along a side of the face,
   wherein the protective layer includes an adjacent-face protective layer that covers at least a part of the one or more adjacent faces, and
   wherein the adjacent-face protective layer has an internal space formed therein, the internal space being directly communicated with the internal space of the inlet protective layer, an arithmetic average roughness Ras of an inner peripheral surface of the internal space of the adjacent-face protective layer satisfying at least one of conditions below: the arithmetic average roughness Ras is 8 μm or more, and the arithmetic average roughness Ras is higher than the arithmetic average roughness Rac.

5. The sensor element according to claim 1,
   wherein the element body has an elongate shape having a longitudinal direction, and
   wherein the face on which the gas inlet opens is an end surface of the element body in the longitudinal direction.

6. The sensor element according to claim 5,
   wherein the element body is a layered body including a plurality of layers composed of the solid electrolyte body, the layers being stacked on top of one another in a stacking direction perpendicular to the longitudinal direction,
   wherein the surface of the element body includes the end surface and a plurality of adjacent faces that each meet the end surface along a side of the end surface,
   wherein the protective layer includes an adjacent-face protective layer that covers the plurality of adjacent faces, and
   wherein parts of the adjacent-face protective layer which each cover a specific one of top and bottom surfaces included in the adjacent faces, the top and bottom surfaces being located at respective ends of the element body in the stacking direction, each have an internal space formed therein and include an outer protective layer arranged closer to the outside of the sensor element than the internal space and an inner protective layer arranged closer to the inside of the sensor element than the internal space, the inner protective layer being bonded on the surface of the element body.

7. A gas sensor comprising the sensor element according to claim 1.

* * * * *